United States Patent [19]

Fulker et al.

[11] 4,072,282

[45] Feb. 7, 1978

[54] SUPERCRITICAL AEROFOILS

[75] Inventors: John Leslie Fulker, Bedford; David John Hall, Stevenage; Robert Christopher Lock, West Byfleet, all of England

[73] Assignee: The Secretary of State for Defence in Her Britannic Majesty's Government of the United Kingdom of Great Britain and Northern Ireland, London, England

[21] Appl. No.: 663,903

[22] Filed: Mar. 4, 1976

[30] Foreign Application Priority Data

Mar. 4, 1975 United Kingdom ............... 9017/75

[51] Int. Cl.² .............................................. B64C 3/14
[52] U.S. Cl. .............................................. 244/35 R
[58] Field of Search ...................... 244/35 R, 44, 219

[56] References Cited

U.S. PATENT DOCUMENTS

| 3,716,209 | 2/1973 | Pierce | 244/44 |
| 3,952,971 | 4/1976 | Whitcomb | 244/35 R |

OTHER PUBLICATIONS

Wetmore, Warren C., "New Design For Transonic Wing to be Tested On Modified F-8," *Aviation Week & Space Technology*, 2/17/1969, pp. 22-23.

*Primary Examiner*—Barry L. Kelmachter
*Attorney, Agent, or Firm*—Cameron, Kerkam, Sutton, Stowell & Stowell

[57] ABSTRACT

A supercritical aerofoil having a large leading edge radius of curvature, a radius of curvature over substantially the whole upper surface appreciably higher than the mean radius over the front half of the lower surface, a concave surface to the rear half of the lower surface, and a thickness/chord ratio of 10 – 14%.

3 Claims, 51 Drawing Figures

AEROFOIL SECTIONS A & B

VARIATION OF LIFT COEFFICIENT WITH MACH NUMBER-SECTION A

VARIATION OF LIFT COEFFICIENT WITH MACH NUMBER SECTION B

VARIATION OF DRAG COEFFICIENT WITH MACH NUMBER—SECTION A

VARIATION OF DRAG COEFFICIENT WITH MACH NUMBER SECTION B

FIG. 8. COMPARISON OF SEPARATION ('BUFFET') BOUNDARIES

VARIATION OF PITCHING MOMENT COEFFICIENT WITH LIFT COEFFICIENT & MACH NUMBER—SECTION A

Figure 10:
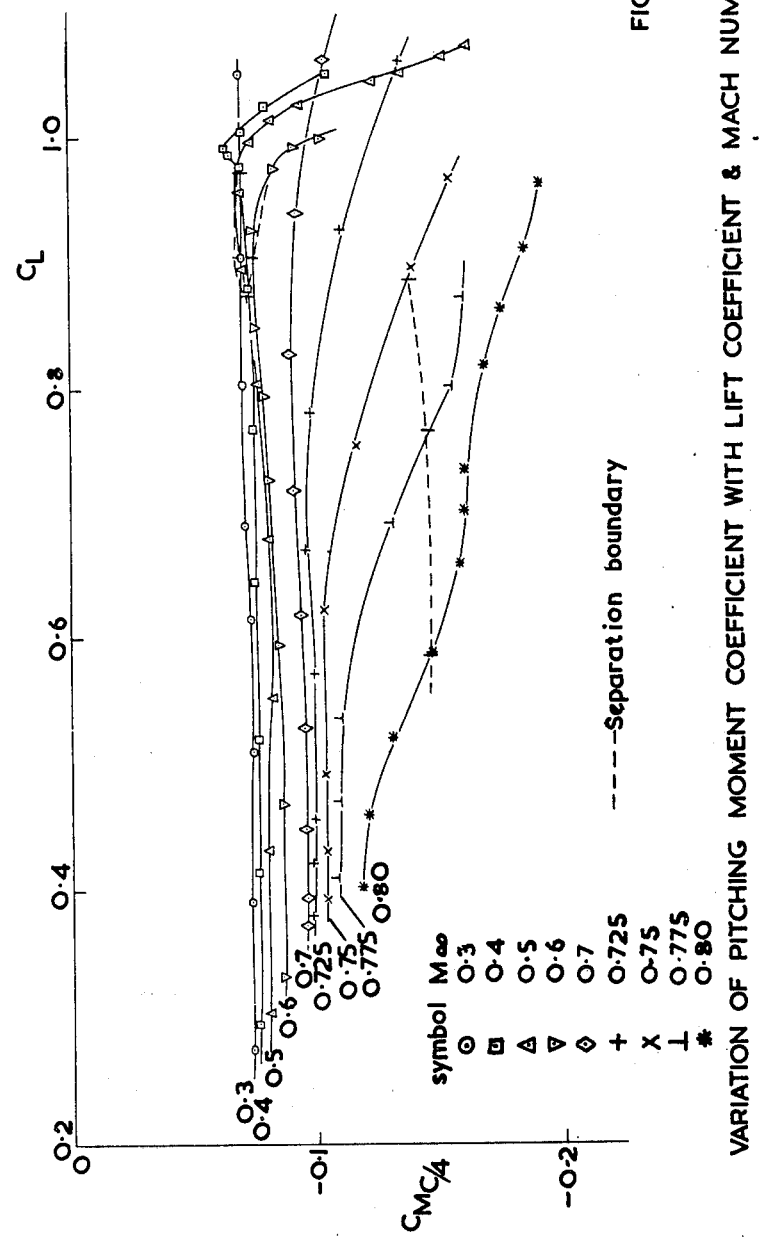
Figure 11:
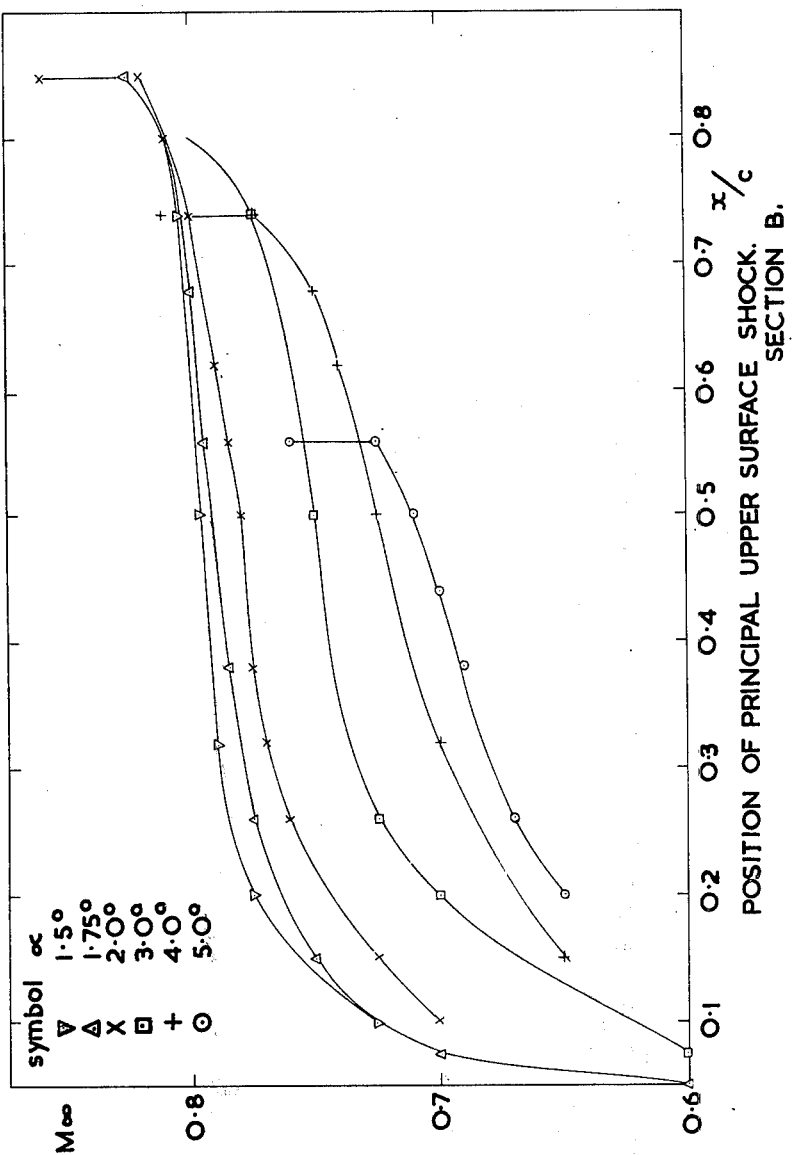
Figure 12:
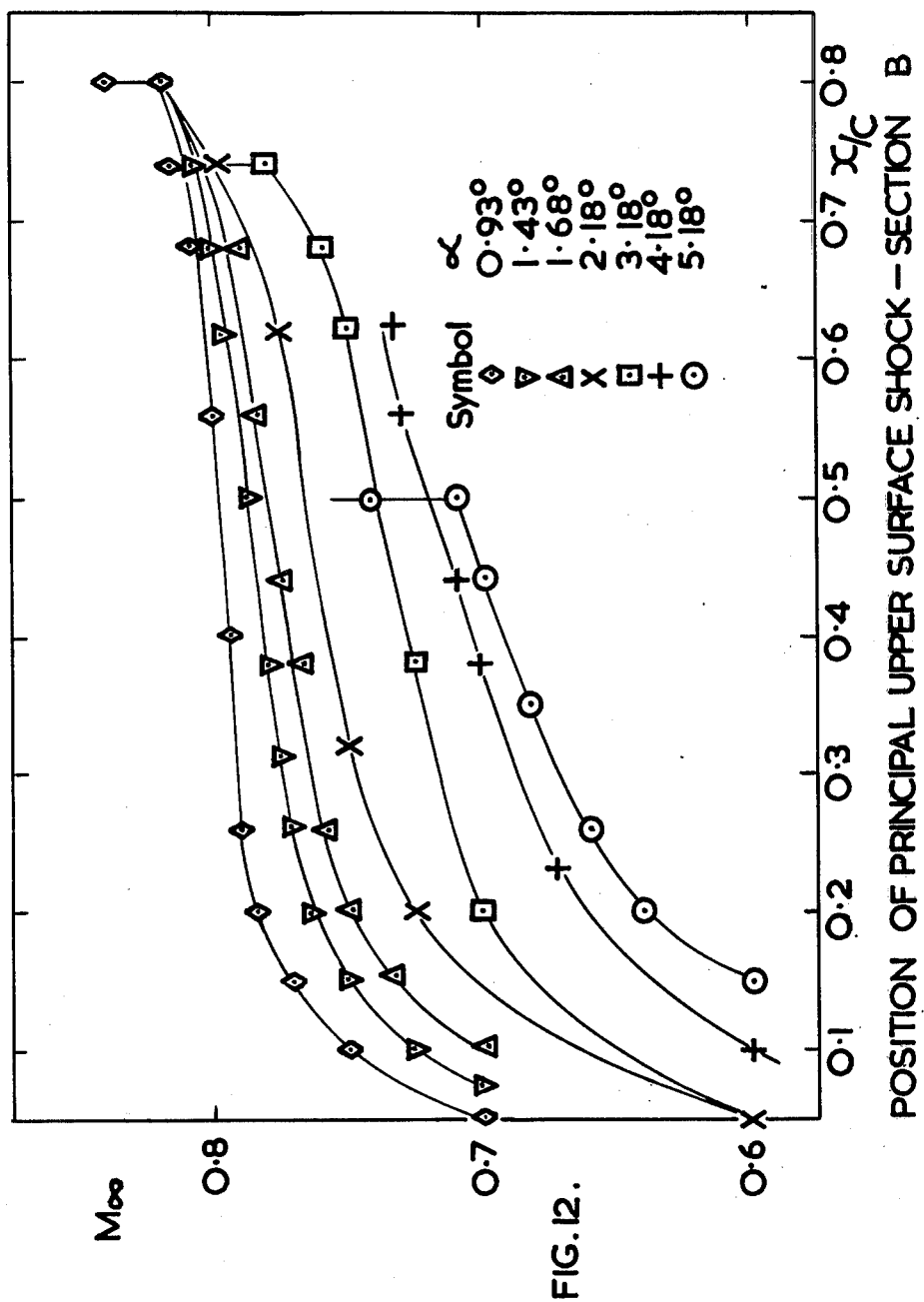

FIG.10. VARIATION OF PITCHING MOMENT COEFFICIENT WITH LIFT COEFFICIENT & MACH NUMBER—SECTION B

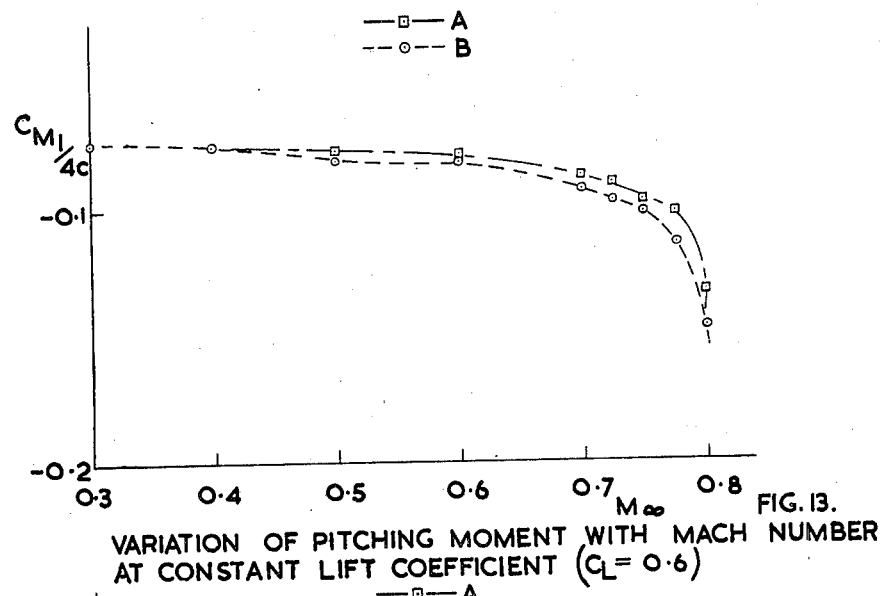
FIG. 13. VARIATION OF PITCHING MOMENT WITH MACH NUMBER AT CONSTANT LIFT COEFFICIENT ($C_L = 0.6$)
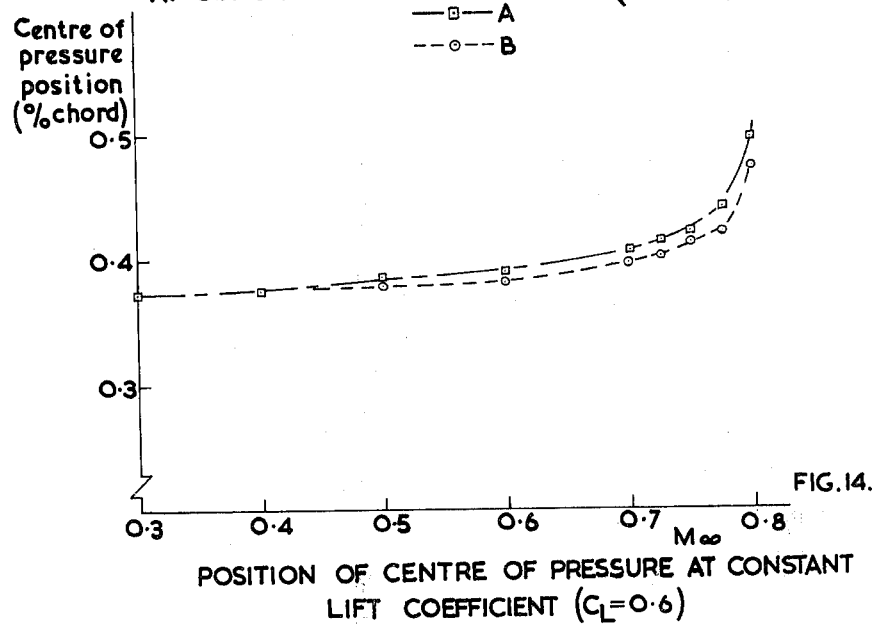
FIG. 14. POSITION OF CENTRE OF PRESSURE AT CONSTANT LIFT COEFFICIENT ($C_L = 0.6$)

VARIATION IN POSITION OF UPPER SURFACE SHOCK WITH $M_\infty$ AT CONSTANT $C_L$ — SECTION A VARIATION IN POSITION OF UPPER SURFACE SHOCK WITH M AT CONSTANT $C_L$ — SECTION B SECTION A—PRESSURE DISTRIBUTIONS $\alpha = 2°$ COMPARISON OF PREDICTED & EXPERIMENTAL SONIC-RANGE PRESSURE DISTRIBUTION—SECTION B COMPARISON OF PREDICTED & EXPERIMENTAL SONIC-RANGE PRESSURE DISTRIBUTION—SECTION A

FIG. 27. COMPARISON OF PRESSURE DISTRIBUTIONS AT 'DESIGN' CONDITION (M ≃ 0.80)

FORCES ON AEROFOILS A & B

VARIATION OF $H/H_o$ THROUGH THE WAKE FOR SECTION A $\alpha = 2°$

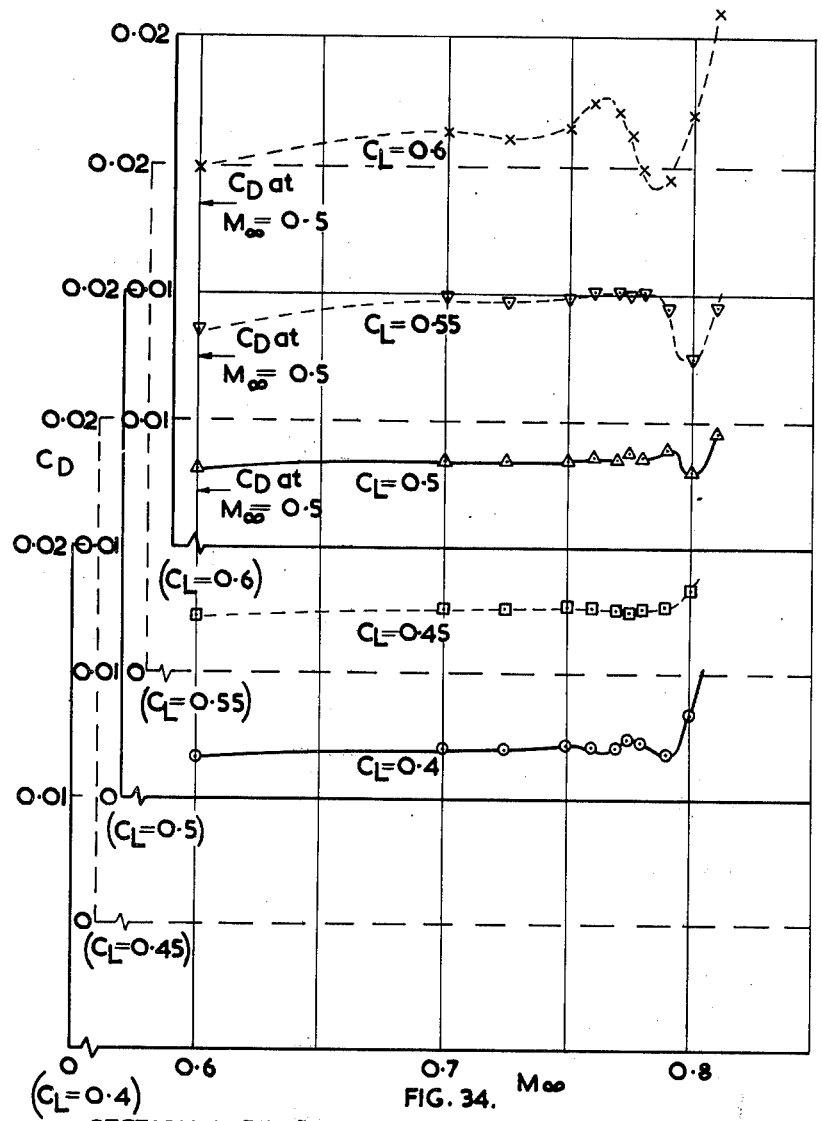
FIG. 34. SECTION A-DRAG AT CONSTANT LIFT COEFFICIENT

SECTION B—DRAG AT CONSTANT LIFT COEFFICIENT

SECTION A COUNTOUR OF DRAG INCREMENT

SECTION B — CONTOURS OF DRAG INCREMENT.

FIG. 42. SECTION A-UPPER SURFACE PRESSURE DISTRIBUTIONS M=0.3

SECTION B—UPPER SURFACE DISTRIBUTIONS M=0.3

COMPARISON OF PRESSURE DISTRIBUTIONS AT $C_L$=0.28 M=0.3

COMPARISON OF PRESSURE DISTRIBUTIONS AT $C_L=0.51$ $M=0.3$

LOW SPEED LIFT CURVES. FIG. 47.

SECTION A ORDINATES

| x/c | (y/c) upper | (y/c) lower | x/c | (y/c) upper | (y/c) lower | x/c | (y/c) upper | (y/c) lower |
|---|---|---|---|---|---|---|---|---|
| 0 | 0 | 0 | 0.014 | 0.01867 | −0.02129 | 0.38 | 0.04930 | −0.05709 |
| 0.0002 | 0.00256 | −0.00284 | 0.0145 | 0.01888 | −0.02161 | 0.40 | 0.04970 | −0.05592 |
| 0.0004 | 0.00361 | −0.00399 | 0.015 | 0.01909 | −0.02192 | 0.42 | 0.05002 | −0.05452 |
| 0.0006 | 0.00442 | −0.00487 | 0.0155 | 0.01929 | −0.02222 | 0.44 | 0.05026 | −0.05291 |
| 0.0008 | 0.00510 | −0.00560 | 0.016 | 0.01948 | −0.02252 | 0.46 | 0.05042 | −0.05103 |
| 0.001 | 0.00570 | −0.00624 | 0.0165 | 0.01967 | −0.02281 | 0.48 | 0.05050 | −0.04891 |
| 0.0012 | 0.00624 | −0.00682 | 0.017 | 0.01985 | −0.02310 | 0.50 | 0.05049 | −0.04650 |
| 0.0014 | 0.00674 | −0.00734 | 0.0175 | 0.02003 | −0.02338 | 0.52 | 0.05041 | −0.04373 |
| 0.0016 | 0.00721 | −0.00783 | 0.018 | 0.02020 | −0.02366 | 0.54 | 0.05024 | −0.04069 |
| 0.0018 | 0.00764 | −0.00828 | 0.0185 | 0.02037 | −0.02394 | 0.56 | 0.04999 | −0.03730 |
| 0.002 | 0.00805 | −0.00871 | 0.019 | 0.02058 | −0.02421 | 0.58 | 0.04965 | −0.03384 |
| 0.0025 | 0.00900 | −0.00969 | 0.0195 | 0.02068 | −0.02448 | 0.60 | 0.04923 | −0.03032 |
| 0.003 | 0.00987 | −0.01057 | 0.02 | 0.02083 | −0.02475 | 0.62 | 0.04873 | −0.02693 |
| 0.0035 | 0.01068 | −0.01137 | 0.03 | 0.02343 | −0.02964 | 0.64 | 0.04815 | −0.02357 |
| 0.004 | 0.01142 | −0.01211 | 0.04 | 0.02550 | −0.03374 | 0.66 | 0.04748 | −0.02015 |
| 0.0045 | 0.01209 | −0.01280 | 0.05 | 0.02723 | −0.03732 | 0.68 | 0.04673 | −0.01674 |
| 0.005 | 0.01270 | −0.01344 | 0.06 | 0.02870 | −0.04039 | 0.70 | 0.04590 | −0.01351 |
| 0.0055 | 0.01324 | −0.01405 | 0.07 | 0.03009 | −0.04299 | 0.72 | 0.04498 | −0.01047 |
| 0.006 | 0.01374 | −0.01463 | 0.08 | 0.03138 | −0.04524 | 0.74 | 0.04397 | −0.00756 |
| 0.0065 | 0.01421 | −0.01518 | 0.09 | 0.03257 | −0.04714 | 0.76 | 0.04288 | −0.00471 |
| 0.007 | 0.01463 | −0.01570 | 0.10 | 0.03368 | −0.04874 | 0.78 | 0.04171 | −0.00214 |
| 0.0075 | 0.01503 | −0.01621 | 0.12 | 0.03567 | −0.05144 | 0.80 | 0.04046 | 0.00007 |
| 0.008 | 0.01541 | −0.01669 | 0.14 | 0.03745 | −0.05367 | 0.82 | 0.03910 | 0.00191 |
| 0.0085 | 0.01576 | −0.01715 | 0.16 | 0.03907 | −0.05546 | 0.84 | 0.03764 | 0.00334 |
| 0.009 | 0.01609 | −0.01760 | 0.18 | 0.04054 | −0.05688 | 0.86 | 0.03604 | 0.00438 |
| 0.0095 | 0.01640 | −0.01803 | 0.20 | 0.04187 | −0.05795 | 0.88 | 0.03426 | 0.00504 |
| 0.010 | 0.01670 | −0.01844 | 0.22 | 0.04309 | −0.05873 | 0.90 | 0.03225 | 0.00532 |
| 0.0105 | 0.01698 | −0.01884 | 0.24 | 0.04420 | −0.05927 | 0.92 | 0.03002 | 0.00519 |
| 0.011 | 0.01725 | −0.01922 | 0.26 | 0.04519 | −0.05958 | 0.94 | 0.02756 | 0.00460 |
| 0.0115 | 0.01751 | −0.01959 | 0.28 | 0.04609 | −0.05970 | 0.96 | 0.02486 | 0.00341 |
| 0.012 | 0.01775 | −0.01995 | 0.30 | 0.04690 | −0.05961 | 0.98 | 0.02194 | 0.00180 |
| 0.0125 | 0.01799 | −0.02030 | 0.32 | 0.04762 | −0.05930 | 1.00 | 0.01879 | 0.0 |
| 0.13 | 0.01823 | −0.02064 | 0.34 | 0.04826 | −0.05878 | | | |
| 0.0135 | 0.01845 | −0.02097 | 0.36 | 0.04883 | −0.05804 | | | |

Fig. 48

SECTION B ORDINATES

| x/c | (y/c) upper | (y/c) lower | x/c | (y/c) upper | (y/c) lower | x/c | (y/c) upper | (y/c) lower |
|---|---|---|---|---|---|---|---|---|
| 0 | 0 | 0 | 0.20 | 0.04887 | -0.04613 | 0.61 | 0.04800 | -0.02960 |
| 0.00005 | 0.00166 | -0.00166 | 0.21 | 0.04933 | -0.04668 | 0.62 | 0.04753 | -0.02810 |
| 0.0002 | 0.00332 | -0.00332 | 0.22 | 0.04977 | -0.04719 | 0.63 | 0.04704 | -0.02661 |
| 0.0005 | 0.00523 | -0.00523 | 0.23 | 0.05017 | -0.04767 | 0.64 | 0.04652 | -0.02512 |
| 0.001 | 0.00736 | -0.00736 | 0.24 | 0.05054 | -0.04811 | 0.65 | 0.04599 | -0.02363 |
| 0.0015 | 0.00898 | -0.00898 | 0.25 | 0.05088 | -0.04852 | 0.66 | 0.04543 | -0.02215 |
| 0.002 | 0.01032 | -0.01032 | 0.26 | 0.05118 | -0.04889 | 0.67 | 0.04485 | -0.02068 |
| 0.0025 | 0.01148 | -0.01148 | 0.27 | 0.05147 | -0.04922 | 0.68 | 0.04425 | -0.01923 |
| 0.003 | 0.01251 | -0.01251 | 0.28 | 0.05172 | -0.04952 | 0.69 | 0.04363 | -0.01780 |
| 0.0035 | 0.01345 | - | 0.29 | 0.05195 | -0.04979 | 0.70 | 0.04298 | -0.01640 |
| 0.004 | 0.01431 | -0.01409 | 0.30 | 0.05215 | -0.05002 | 0.71 | 0.04232 | -0.01503 |
| 0.005 | 0.01584 | -0.01516 | 0.31 | 0.05234 | -0.05021 | 0.72 | 0.04163 | -0.01370 |
| 0.006 | 0.01718 | -0.01603 | 0.32 | 0.05250 | -0.05036 | 0.73 | 0.04092 | -0.01240 |
| 0.007 | 0.01837 | -0.01679 | 0.33 | 0.05263 | -0.05047 | 0.74 | 0.04019 | -0.01115 |
| 0.008 | 0.01943 | -0.01748 | 0.34 | 0.05275 | -0.05054 | 0.75 | 0.03943 | -0.00995 |
| 0.009 | 0.02039 | -0.01812 | 0.35 | 0.05285 | -0.05056 | 0.76 | 0.03866 | -0.00880 |
| 0.010 | 0.02126 | -0.01872 | 0.36 | 0.05292 | -0.05053 | 0.77 | 0.03786 | -0.00772 |
| 0.011 | 0.02205 | -0.01929 | 0.37 | 0.05298 | -0.05046 | 0.78 | 0.03705 | -0.00670 |
| 0.012 | 0.02277 | -0.01983 | 0.38 | 0.05301 | -0.05033 | 0.79 | 0.03621 | -0.00576 |
| 0.013 | 0.02342 | -0.02034 | 0.39 | 0.05302 | -0.05015 | 0.80 | 0.03534 | -0.00490 |
| 0.015 | 0.02457 | -0.02130 | 0.40 | 0.05301 | -0.04991 | 0.81 | 0.03445 | -0.00412 |
| 0.020 | 0.02694 | -0.02328 | 0.41 | 0.05298 | -0.04962 | 0.82 | 0.03354 | -0.00344 |
| 0.025 | 0.02883 | -0.02492 | 0.42 | 0.05293 | -0.04926 | 0.83 | 0.03260 | -0.00285 |
| 0.030 | 0.03035 | -0.02632 | 0.43 | 0.05286 | -0.04885 | 0.84 | 0.03163 | -0.00236 |
| 0.035 | 0.03165 | -0.02757 | 0.44 | 0.05277 | -0.04838 | 0.85 | 0.03063 | -0.00197 |
| 0.040 | 0.03281 | -0.02870 | 0.45 | 0.05265 | -0.04784 | 0.86 | 0.02959 | -0.00167 |
| 0.05 | 0.03484 | -0.03074 | 0.46 | 0.05252 | -0.04722 | 0.87 | 0.02851 | -0.00148 |
| 0.06 | 0.03656 | -0.03251 | 0.47 | 0.05237 | -0.04654 | 0.88 | 0.02737 | -0.00140 |
| 0.07 | 0.03804 | -0.03406 | 0.48 | 0.05220 | -0.04578 | 0.89 | 0.02618 | -0.00142 |
| 0.08 | 0.03937 | -0.03546 | 0.49 | 0.05200 | -0.04494 | 0.90 | 0.02493 | -0.00155 |
| 0.09 | 0.04058 | -0.03675 | 0.50 | 0.05179 | -0.04402 | 0.91 | 0.02363 | -0.00178 |
| 0.10 | 0.04170 | -0.03795 | 0.51 | 0.05155 | -0.04301 | 0.92 | 0.02226 | -0.00213 |
| 0.11 | 0.04272 | -0.03906 | 0.52 | 0.05129 | -0.04193 | 0.93 | 0.02083 | -0.00260 |
| 0.12 | 0.04365 | -0.04008 | 0.53 | 0.05101 | -0.04077 | 0.94 | 0.01934 | -0.00318 |
| 0.13 | 0.04449 | -0.04104 | 0.54 | 0.05071 | -0.03954 | 0.95 | 0.01779 | -0.00387 |
| 0.14 | 0.04525 | -0.04192 | 0.55 | 0.05039 | -0.03823 | 0.96 | 0.01618 | -0.00469 |
| 0.15 | 0.04596 | -0.04274 | 0.56 | 0.05004 | -0.03687 | 0.97 | 0.01451 | -0.00561 |
| 0.16 | 0.04662 | -0.04351 | 0.57 | 0.04968 | -0.03547 | 0.98 | 0.01278 | -0.00667 |
| 0.17 | 0.04724 | -0.04423 | 0.58 | 0.04929 | -0.03403 | 0.99 | 0.01099 | -0.00784 |
| 0.18 | 0.04782 | -0.04490 | 0.59 | 0.04888 | -0.03257 | 1.00 | 0.00914 | -0.00914 |
| 0.19 | 0.04836 | -0.04553 | 0.60 | 0.04845 | -0.03109 | | | |

Fig. 49

SUPERCRITICAL AEROFOILS

The present invention relates to aerofoils. It is particularly concerned with supercritical aerofoils, ie those designed to maximise lift and minimise drag in the subsonic free stream air speed conditions when locally Mach 1 is exceeded.

The present invention provides a supercritical aerofoil having a leading edge, an upper and a lower surface and a trailing edge and wherein the leading edge is circular with a radius of 2% to 4% chord; the upper surface has (a) a forward transition zone extending from said leading edge to about 20% of the distance along the chord and wherein the upper surface curvature radius increases rapidly from said leading edge radius to one between about 3 and 5 times the chord, (b) a constant radius zone extending from said forward transition zone for about 0.5 to 0.8 of the chord length and wherein the radius is substantially constant at 3 to 5 times the chord, and (c) a rear zone extending to the trailing edge and wherein the curvature decreases rearwardly, the lower surface has (a) a forward zone extending from the leading edge to between about 40% and 55% of the chord the radius of curvature whereof is at least equal to the chord but smaller than said upper surface constant radius zone radius, (b) a curvature transition zone extending from said forward zone to between 55% and 70% chord, and (c) a rearward zone extending from the transition zone to about the trailing edge and which is concave and has a mean radius of about equal to the chord, whereby a rear part of the aerofoil is effectively cambered, the aerofoil having also a drooped leading edge, and a thickness/chord ratio of 10% to 14%, whereby in use at supercritical speeds air passing over the upper surface is rapidly accelerated over the leading edge and forward zone to a supersonic speed and decelerated sufficiently before the trailing edge to permit the effective camber of the rear part of the aerofoil to augment the lift and without generating a shock wave sufficiently strong to cause a significant increase in drag, and in use at low speeds sufficient lift is generated for take off and landing on normal length runways.

Thus the aerofoil has a relatively flat upper surface compared with the lower. Advantageously, the variation of curvature on the upper and lower surfaces is smooth.

A base thickness of up to about 2% chord may be used to alleviate the adverse pressure gradient on the upper surface near the trailing edge together, if necessary, with a splitter plate of length equal to 1% to 2% chord to inhibit vortex shedding.

A supercritical wing has over the upper surface thereof at high subsonic free stream Mach numbers relatively large regions of controlled supersonic flow, terminating in at most a weak shock wave, and thus minimising drag. As below about M = 0.8 a rear portion of the wing would have subsonic flow local to both surfaces, the lift of the wing at all flight speeds thereunder is enhanced by concaving the lower surface towards the trailing edge as required in sections according to the present invention. The nose droop called for in the first above mentioned embodiment enables a lift coefficient ($C_L$) of 1.2 to be obtained at low speeds without the use of a slot or other high lift device.

Thus it is a feature of sections in accordance with the invention that good low speed performance has been obtained, by means of the drooped leading edge, without deleterious reduction in performance at supercritical speeds. Nevertheless full advantage can be taken of a supercritical aerofoil by incorporating a flexible leading edge, preferably of a type which enables accurate attainment of the required profile in all flight conditions within the prescribed envelope. Such a flexible leading edge is described in U.S. Pat. No. 3,716,209.

Aerofoils in accordance with the invention can therefore be particularly useful on transport aircraft designed to cruise between Mach 0.7 and 0.9 depending on the sweep of the wing. It will be appreciated that in the incorporation of aerofoils according to the invention into practical aircraft wings account will be taken of wing sweep and wing tip root and body effects. For most of the wing the application of standard sweep factors substantially suffices. Elsewhere standard techniques are applied to either or both of the aerofoil dimensions and flow characteristics achieved thereby to derive a section which may differ geometrically from the aerofoil in order to achieve similar flow characteristics.

Figure 1:
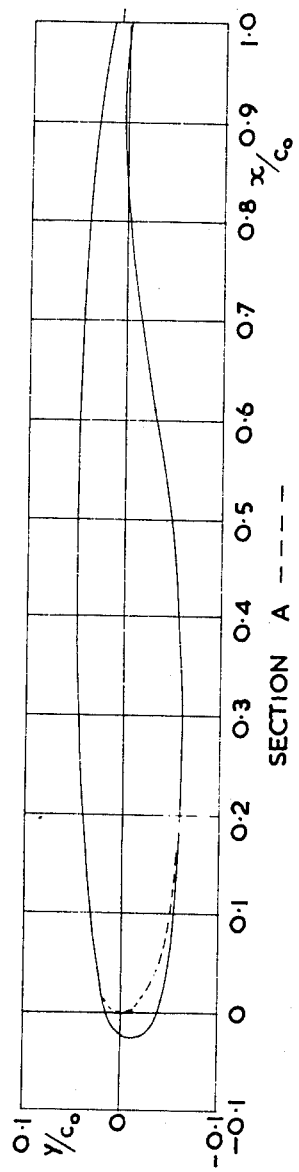
Figure 4:
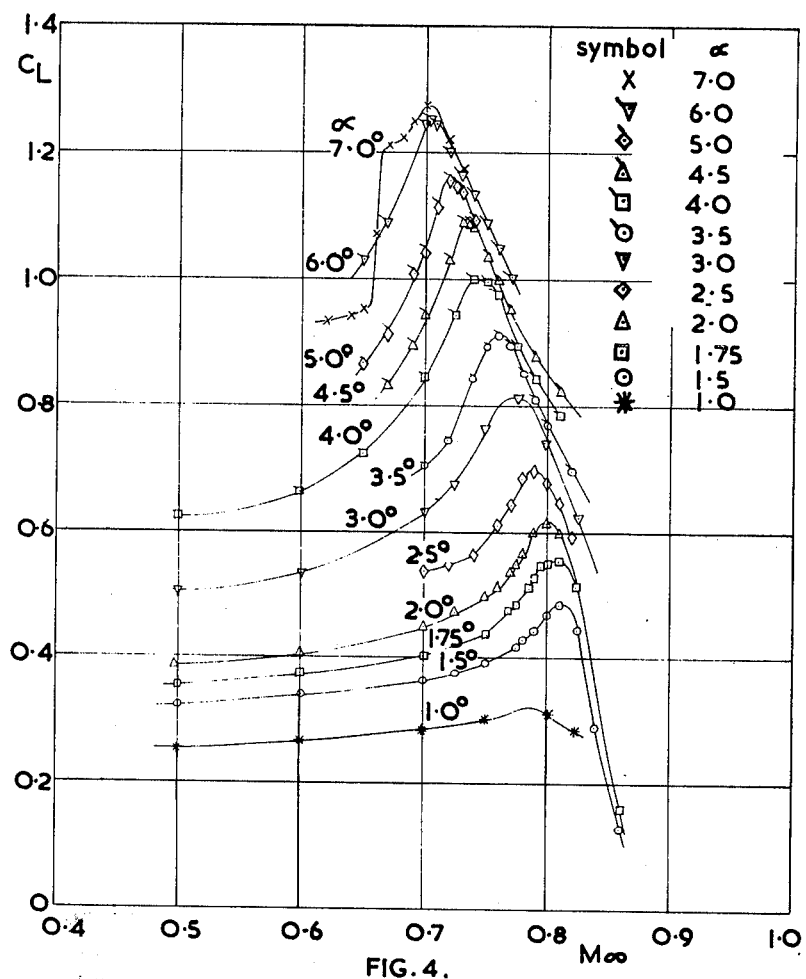
Figure 5:
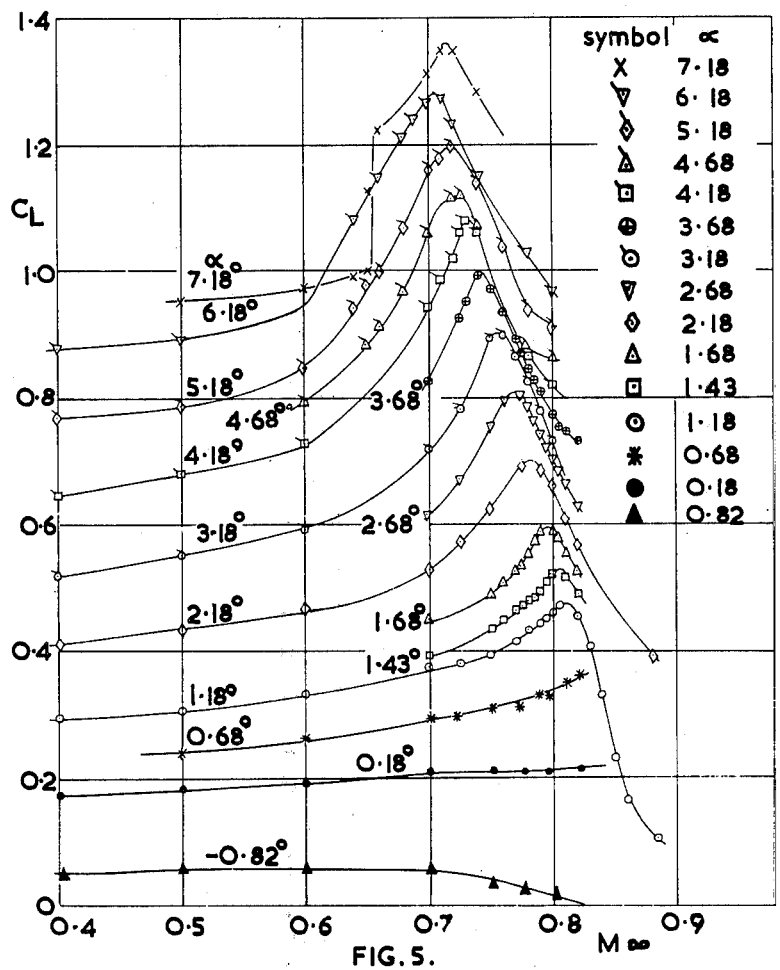
Figure 6:
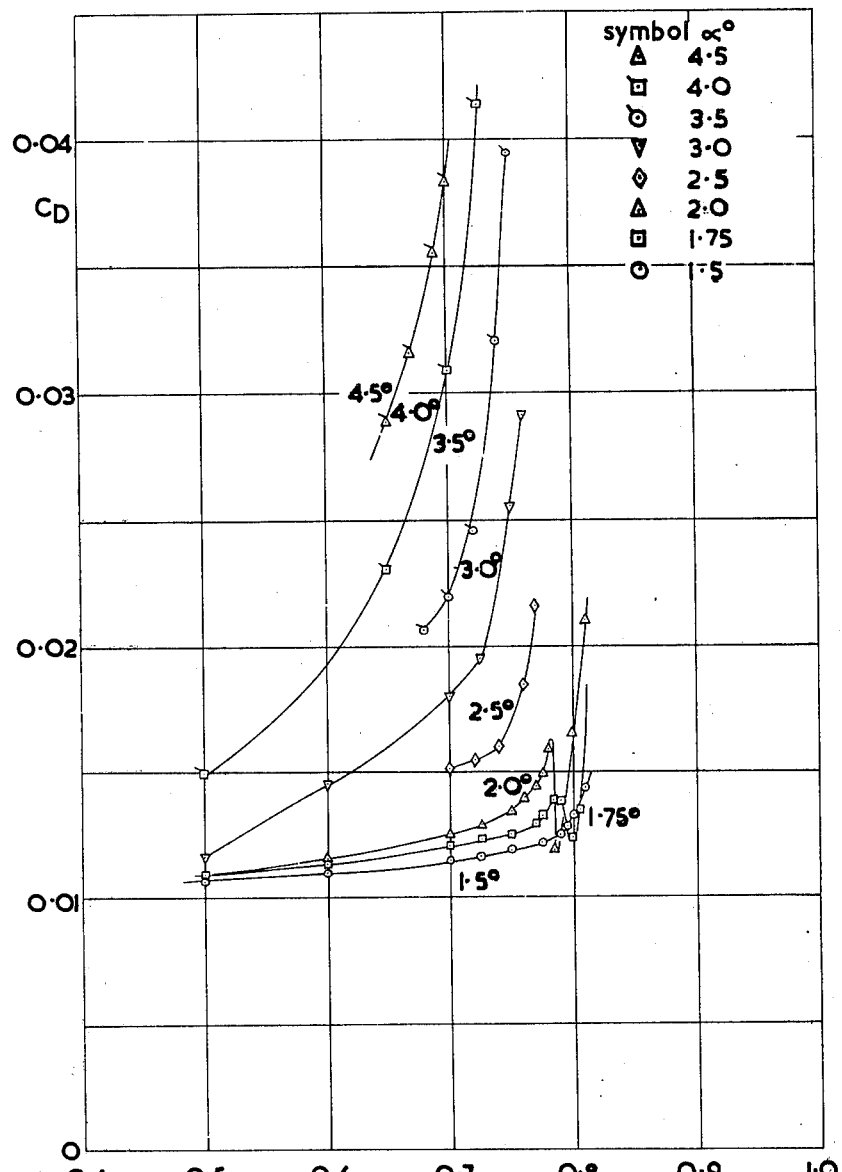
Figure 7:
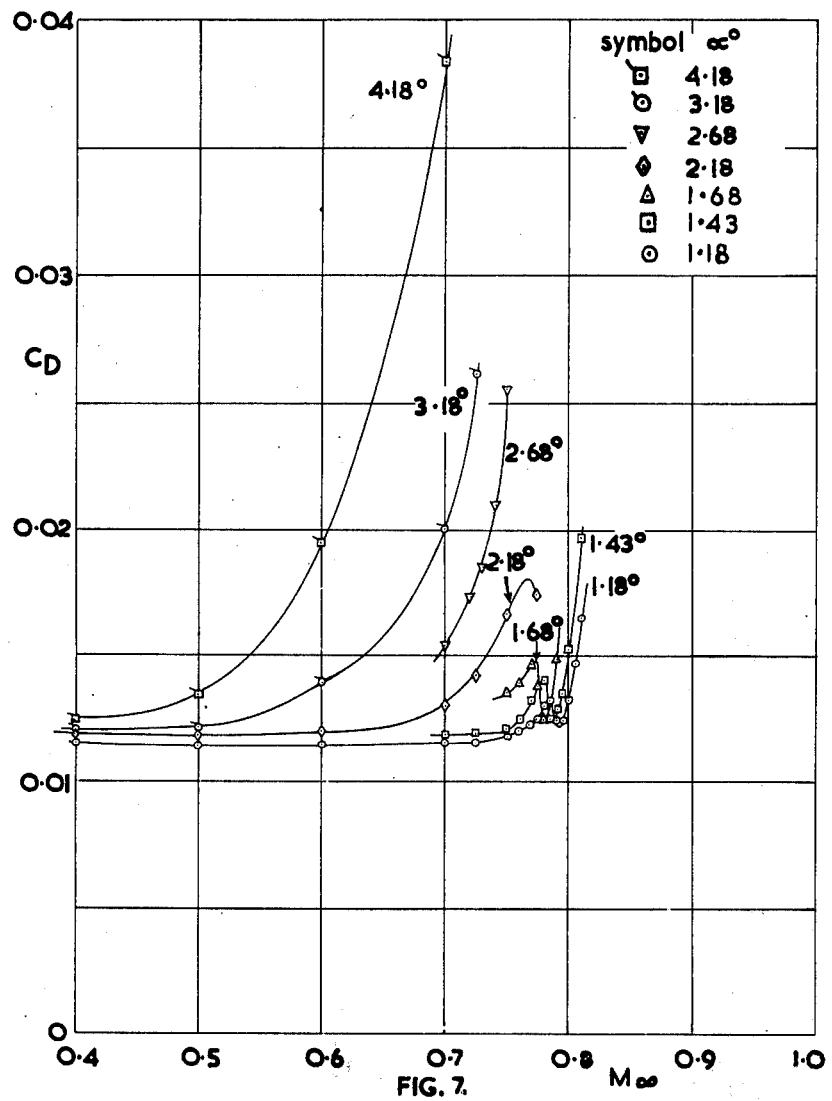
Figure 8:
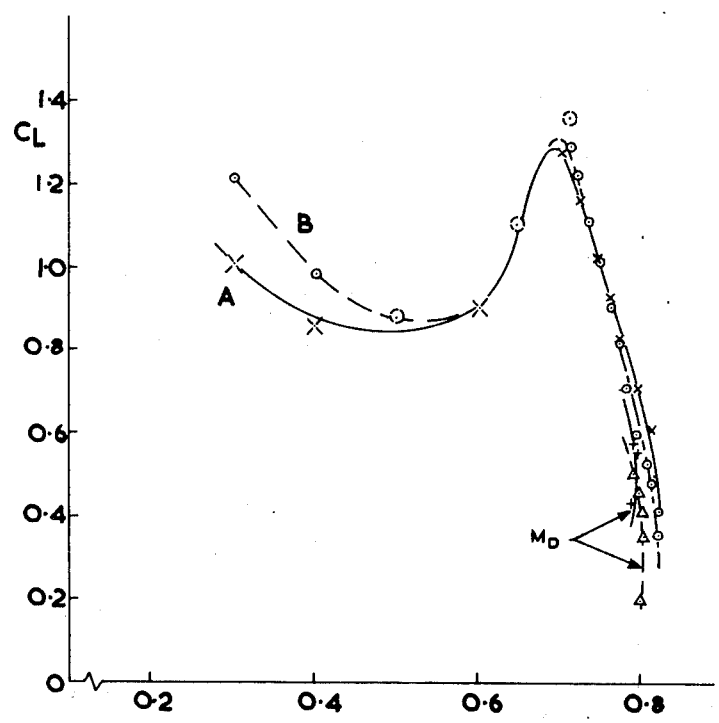
Figure 9:
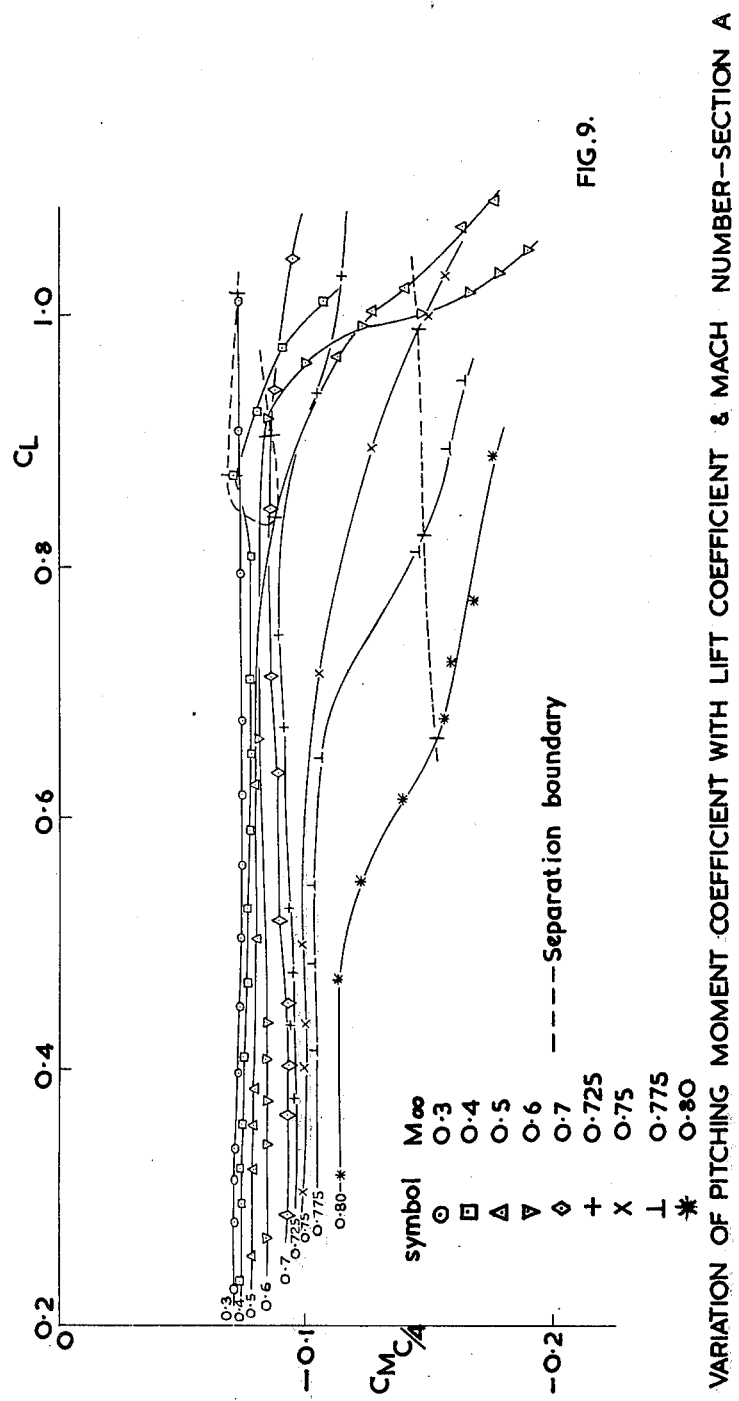

A section B in accordance with the invention and another section A obtainable by flexing the leading edge of the section B, and characteristics of these sections A and B, will now be described by way of example with reference to the accompanying tables and drawings, of which:

FIG. 1 illustrates the shape of the two sections A and B,

FIGS. 2 to 5 are plots of the variation of lift coefficient ($C_L$) with angle of incidence and Mach number for the two sections, FIGS. 6 and 7 are graphs of the variation of drag coefficient ($C_D$) with Mach number for both sections, FIG. 8 is a graph comparing the drag rise and separation boundaries of the two sections, FIGS. 9, 10 and 13 are graphs of the variation of pitching moment coefficient ($C_M$) with Mach number ($M_\infty$) and lift coefficient ($C_L$) for the two sections.

Figure 26:
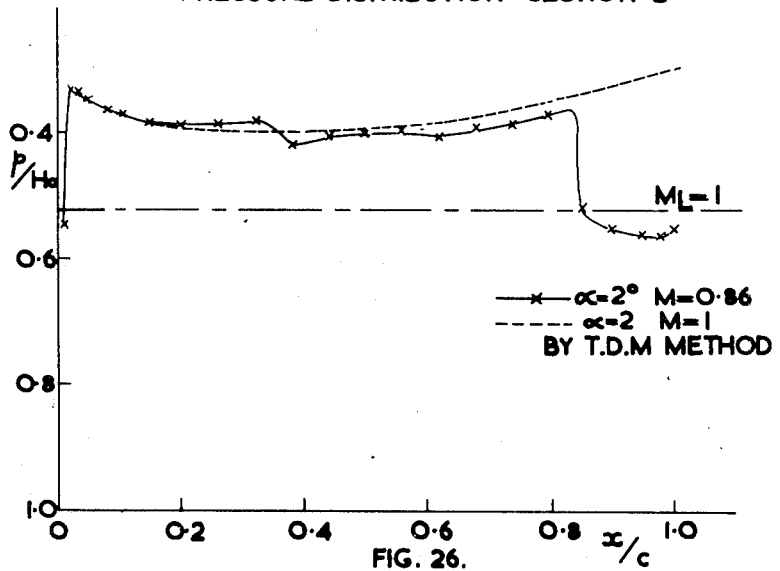
Figure 27:
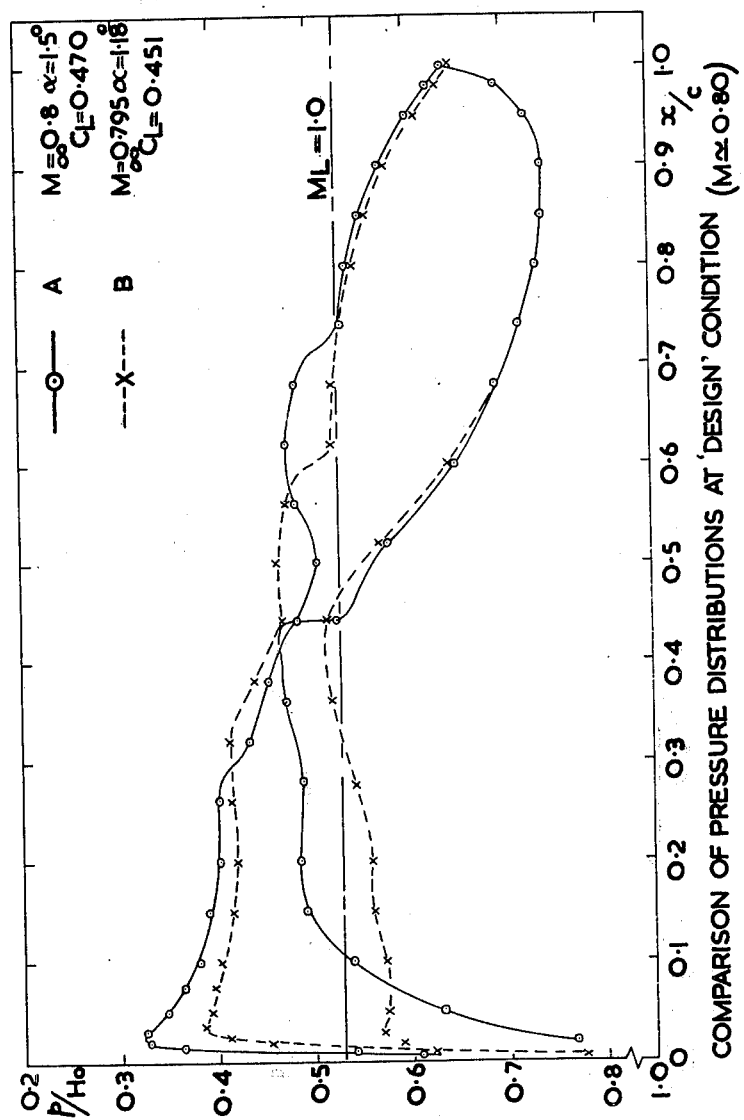
Figure 28:
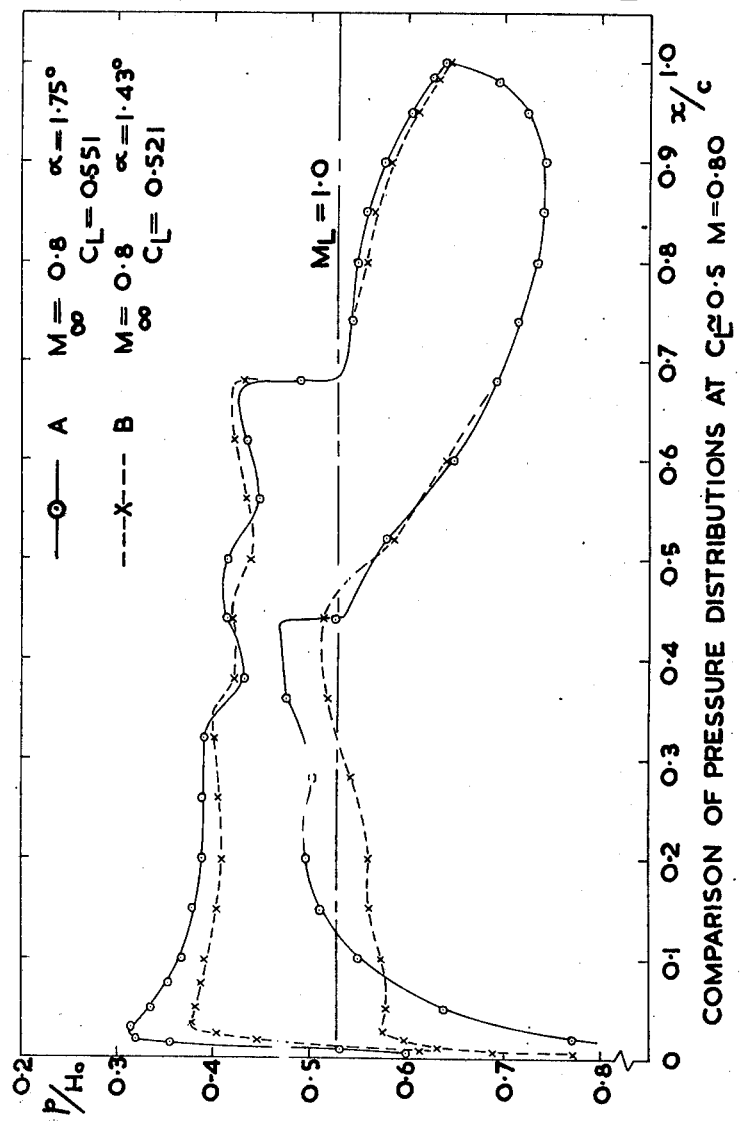
Figure 30:
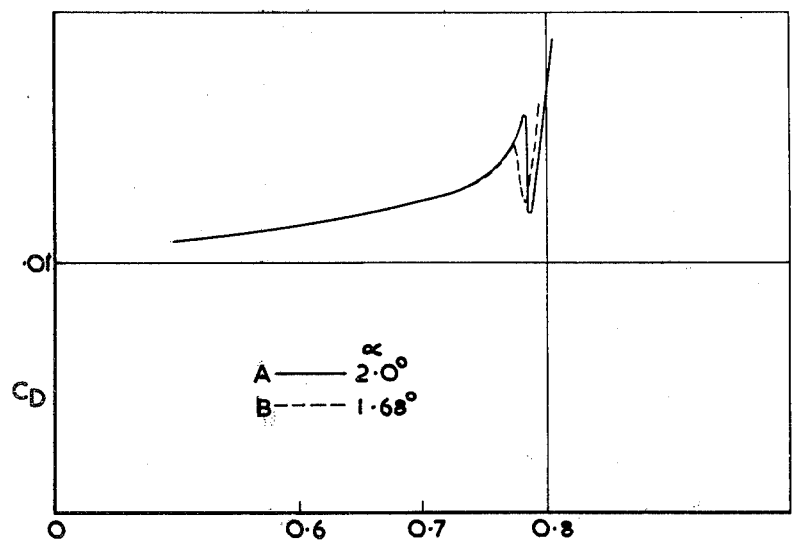
Figure 31:
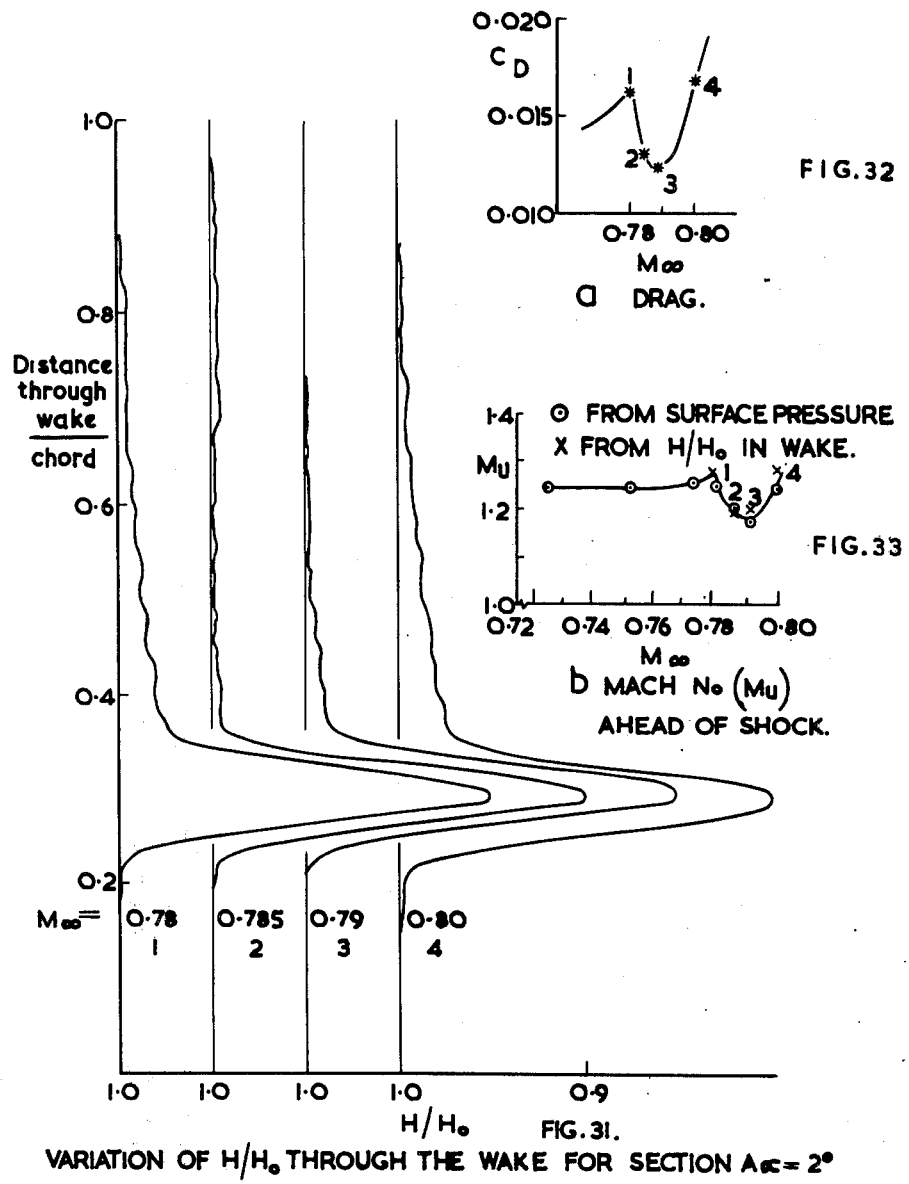
Figure 50:
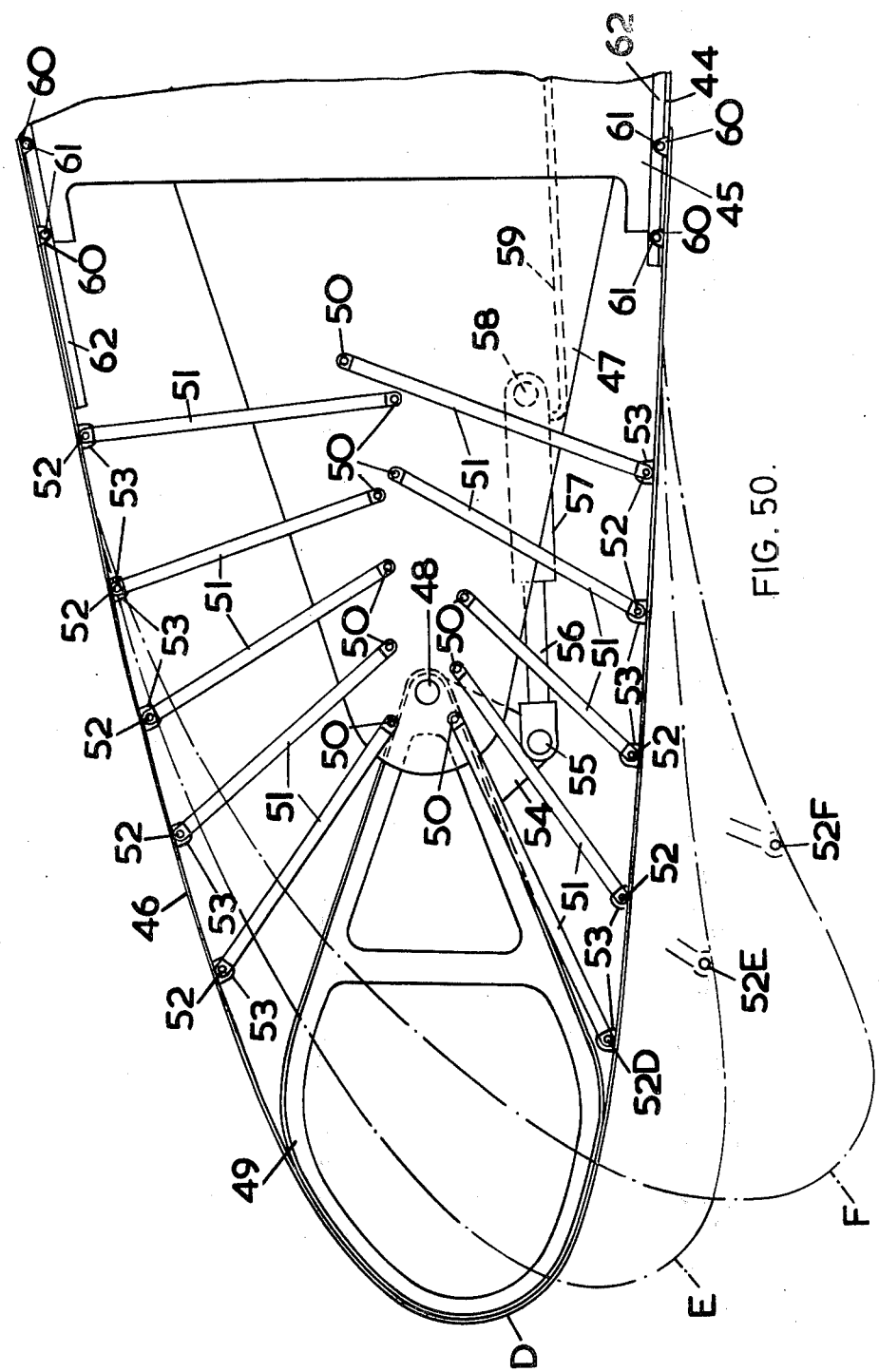
Figure 51:
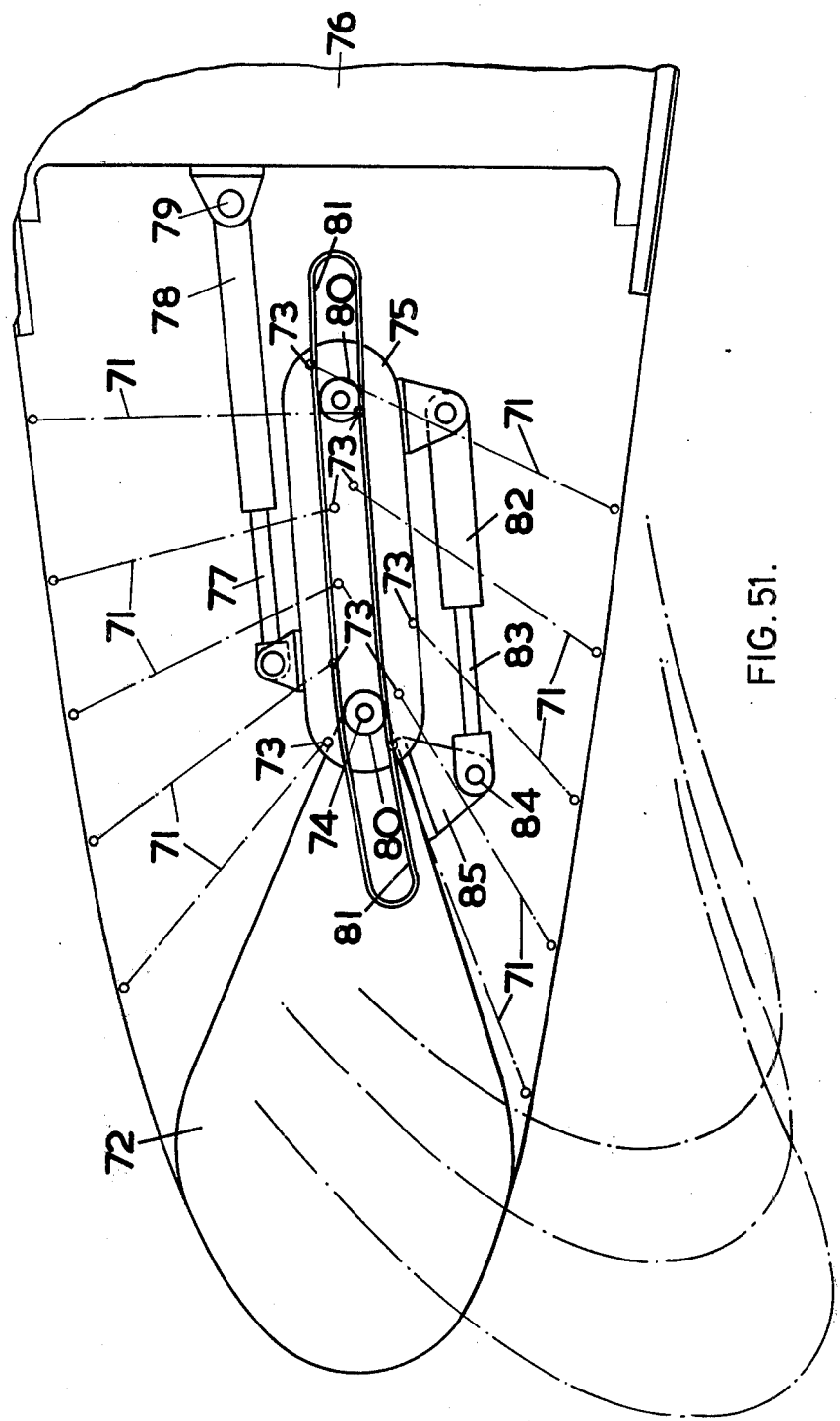

FIGS. 11, 12, 15 and 16 are graphs of the movement of the upper surface shock wave with Mach number, FIG. 14 is a graph of the movement of the centre of pressure with Mach number at a constant lift coefficient, FIGS. 17 to 28 are graphs illustrating pressure and Mach number distributions over sections A and B in various conditions, FIGS. 28 and 30 are graphs comparing the variation with Mach number of $C_L$ and $C_D$ respectively at constant incidence, FIG. 31 is a graph of the variation in pressure across the wake of one section, FIGS. 32 and 33 are graphs of the variation of $C_D$ and $M_u$ derived from FIG. 31, FIGS. 34 to 37 are graphs of the variation of $C_D$ with $M_\infty$ and $C_L$ on both sections, FIGS. 38 to 47 are graphs of the variation of various parameters at medium and low Mach numbers, FIGS. 48 and 49 are tables listing the ordinates of the two sections, and FIGS. 50 and 51 are side elevations of flexible leading edges usable with aerofoils in accordance with the invention.

Of the sections illustrated in FIG. 1 section A has a leading edge radius of 2% chord followed on the upper surface by an increase in curvature radius to about 100% chord at 4% chord, 300% chord at 20% chord and 500% chord at mid chord. This radius is substantially maintained to 70% of the distance along the chord when it falls to about 180% chord by 90% of the distance along the chord, maintaining this value to the trailing edge. On the lower surface the curvature radius increases between about 1% of the distance along the chord and about 6% thereof to a value of about 200% of the chord which is substantially maintained to 50% of the distance along the chord, there being an inflexion at about 60% of the chord and a concave section of radius about 100% chord over the remainder thereof. The section has a base (trailing edge) thickness of 2% chord and a thickness/chord ratio of 11%. Typical ordinates for section A are listed in the table of FIG. 48.

Section B is derived as shown by, so to speak, adding a larger leading edge radius to section A with minimal disturbance of the upper surface shape and fairing to the lower surface, thus imparting a measure of leading edge droop to the section A. The leading edge curvature radius is 3% of the chord, lower surface curvature radius to about 50% chord is about 250% of the chord, and the thickness/chord ratio is about 10.3%. Typical ordinates for section B are listed in the table of FIG. 49.

The aerodynamic data for both sections were obtained under identical conditions, with 0.254 m chord models spanning the 0.36 m dimension of a 36 in × 14 in (0.92 m × 0.36 m) transonic wind tunnel. The floor and ceiling of the tunnel were slotted (4 slots, overall open area ratio = 0.033) and were 0.79 m apart throughout the length of the working section. These conditions are believed to give approximately blockage free results on a NACA0012 section at zero angle of incidence at Mach numbers up to 0.8. For this reason no blockage corrections have been applied to the results, nor have any corrections been applied for lift interference. This should not however be taken to imply that these are not significant; on the contrary in examples like the present, where large regions of supersonic flow are present on one surface, extending in some cases close to the tunnel walls, it is highly probable that appreciable asymmetric interference effects will be present. It is hoped that some guidance on how to allow quantitively for these effects will be provided by recent developments in transonic theory (eg E. M. Murman's AIAA paper 72-1007 (ARC 33902) entitled "Computation of Wall Effects in Ventilated Wind Tunnels"); in the meantime the results are presented without the corrections.

The Reynolds number varies from free stream Mach number ($M_\infty$), since the tunnel always operates with the stagnation pressure approximately atmospheric, the range being from $1.7 \times 10^6$ at $M_\infty = 0.3$ to $3.75 \times 10^6$ at $M_\infty = 0.85$ based upon model chord. Transition tripping bands of approximately 200 grade carborundum (ie particles of the order of 0.8 mm) were used on the models.

On section A the bands were placed from 6% to 8% of chord on the lower surface and from 4% to 6% on the upper surface; on section B the bands were from 6% to 8% on both surfaces. Direct shadow photographs showed that with these bands transition occurred between 0.10 and 0.30 chord downstream of the bands. Pressures were measured at 44 static holes on section A and 49 static holes on section B which were spread across the central 178 mm of the span of the model; the lift and pitching moments were estimated from integration of the local pressures. Profile drag was obtained by wake traverse, using a single total head tube, at a distance of 1 chord length downstream of the trailing edge, which could be traversed through the wake in steps of constant size. In some cases it was necessary to traverse through large vertical distances from the model (of the order of 1 chord length) in order to detect all the momentum losses through the shocks (see FIG. 31).

The models were tested over a range of angles of incidence ($\alpha$) from $\alpha = 1.0°$ to $\alpha = 14°$ for section A and $\alpha = -0.8°$ to $13.2°$ for section B with a range of free stream Mach number from $M_\infty = 0.3$ to $0.88$. Section B was tested at angles of incidence selected such that the upper surfaces of both sections were at the same attitude relative to the free stream; this meant decreasing the angle of incidence by 0.8° when compared with section A since this was the change in the angle of the chord line to upper surface brought about by increasing the nose droop.

Figure 2:
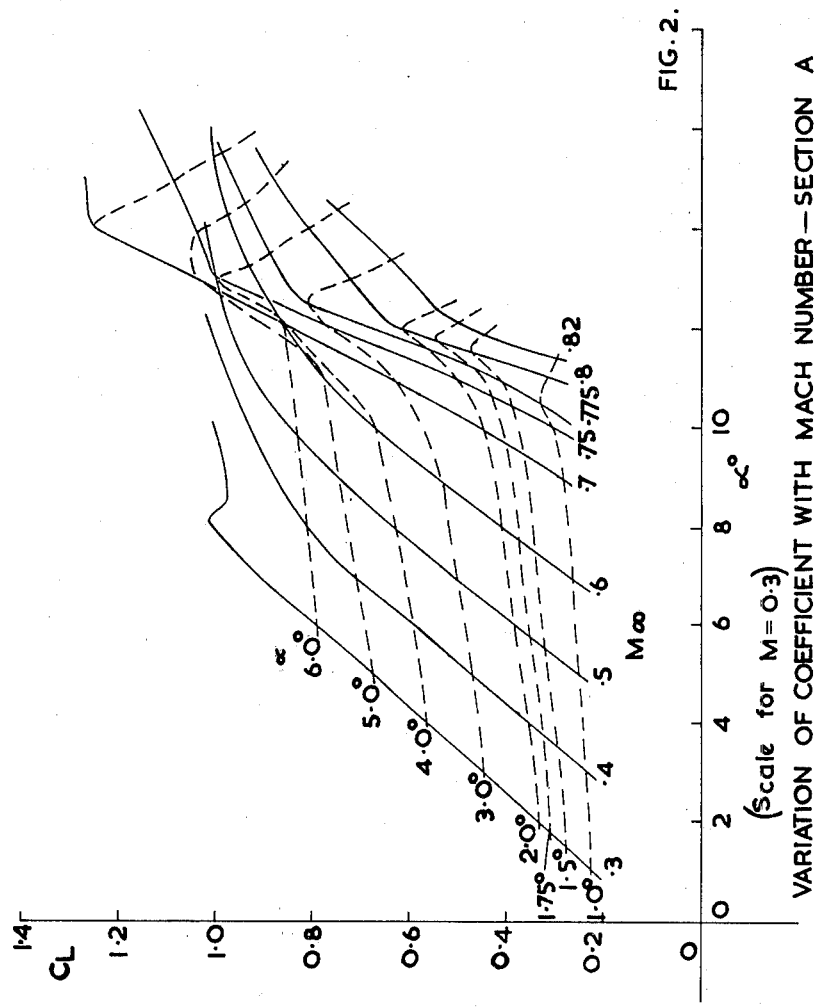
Figure 3:
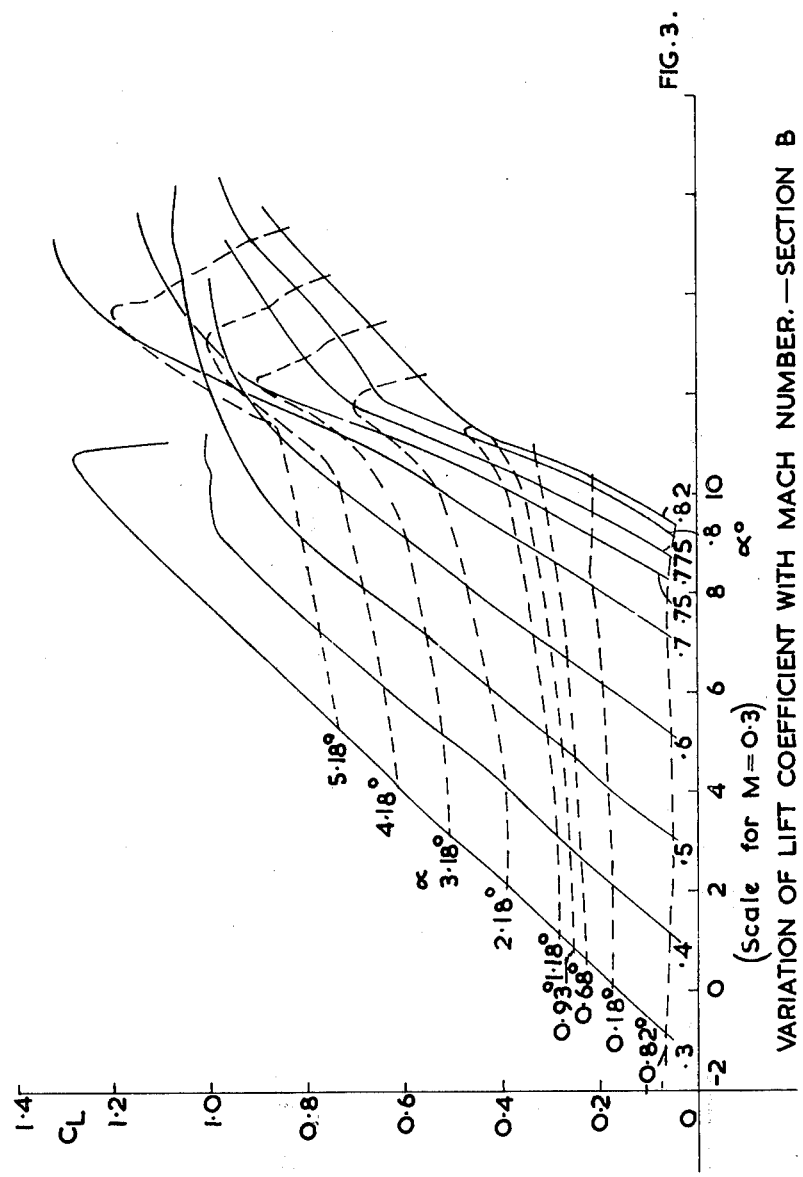

The variations of lift coefficient with angle of incidence and Mach number for the two sections are shown in the "carpet" plots of FIGS. 2 and 3. It can be seen that both sections have very similar lift characteristics, except that at low speeds ($M_\infty = 0.3$), section B shows a 22% gain in $C_L$ max over section A. At Mach numbers between 0.4 and 0.6 both sections display a gentle stall rather than a sudden loss of lift; for Mach numbers greater than 0.7 section A displays a well defined lift-break, whereas section B still has a milder one at most Mach numbers. FIGS. 4 and 5 compare the variation of lift coefficient with Mach number at constant angles of incidence. For both sections the lift coefficient increases steadily with increasing free stream Mach number to a maximum around the Mach number at which rapid drag rise occurs.

FIGS. 6 and 7 show the variation of drag coefficient with Mach numbers. At low angles of incidence the curves are of the usual shape with a pronounced drag "creep" between $M_\infty = 0.75$ and the subsequent rapid drag rise at $M_\infty > 0.80$. At slightly higher angles of incidence a similar drag creep is followed by a rapid reduction of $C_D$ by as much as 0.003 at free stream Mach numbers near 0.79, prior to the eventual rapid drag rise ($M_\infty > 0.80$). The values of $C_D$ at the bottom of this drag "bucket" appear to be consistent with an almost complete absence of wave drag.

From FIGS. 2 to 7, FIG. 8 has been constructed which compares the drag rise and separation boundaries of the two sections. It can be seen that there is little to choose between the sections in terms of drag rise (which is taken as the rapid rise following the drag "bucket"). The separation boundaries are here defined as the locus of points representing $C_L$ max at constant angle of incidences for Mach numbers greater than 0.7, and points taken from the break in the lift curve slope for Mach numbers less than 0.7 (for $M_\infty > 0.7$ these two definitions would be in reasonable agreement — see FIGS. 2 and 3). In terms of separation onset it can be seen that there is little difference between the aerofoils at the higher lift coefficients ($C_L > 0.5$), but for $C_L$ below 0.5, section A has a slightly better separation margin, of the order of 0.01 in Mach number. At Mach numbers between 0.3 and 0.6 section B shows to advantage its modified leading edge shape, which has helped to alleviate the leading edge separation effects. For Mach numbers between 0.6 and 0.7 the leading edge separation gives way suddenly to a shock-induced separation; this accounts for the sudden jump in $C_L$ to be seen in FIGS. 4 and 5 ($\alpha = 7.0°$ and 7.18° respectively, see later). Near $M_\infty = 0.70$ a remarkably high lift coefficient, at least 1.2, is obtained before appreciable separation occurs.

Figure 15:
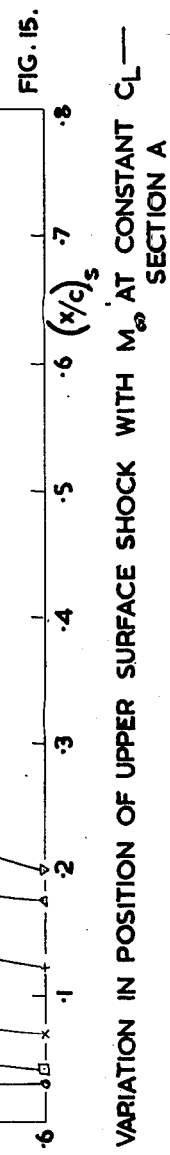
Figure 16:
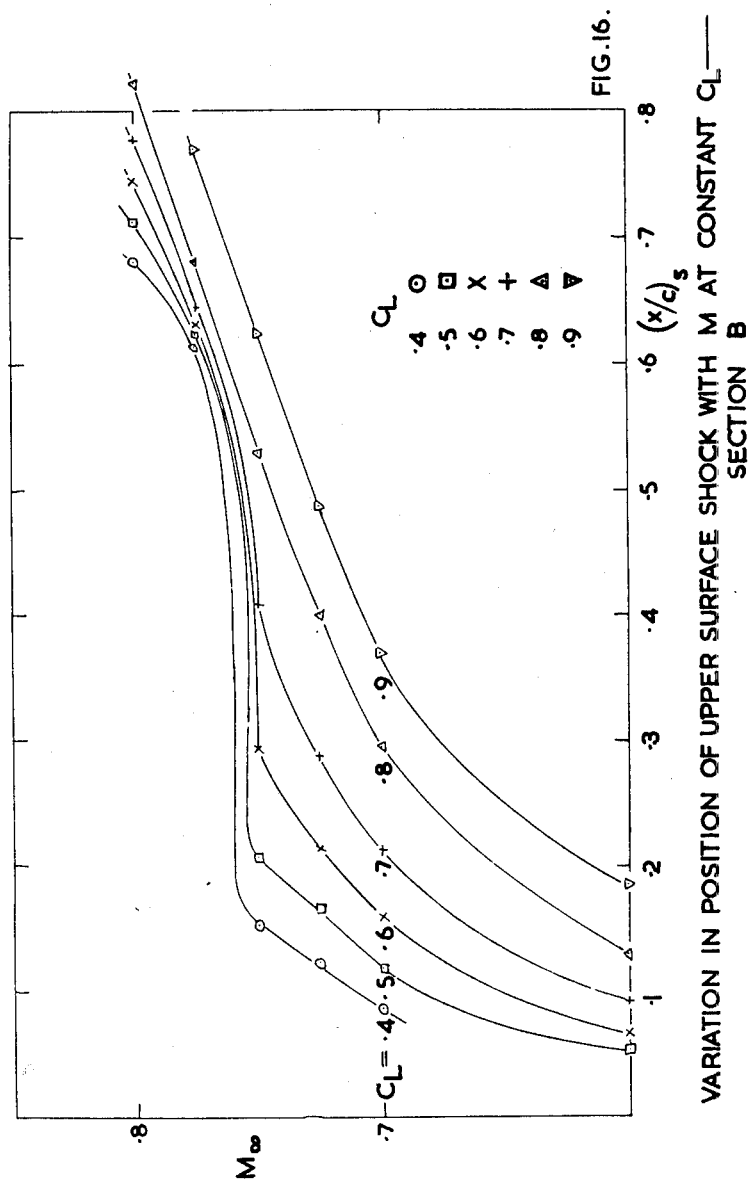

The pitching moment variations for the two sections with $C_L$ and M are shown in FIGS. 9 and 10 and illustrate an effect characteristic of the development of the supercritical flow on the upper surface. This is the increase in nose-down pitching moment that is experienced as the region of supersonic flow spreads downstream of the quarter chord point (the pitching axis), as Mach number increase. As the supersonic region is terminated by a shock wave, the development of this region is indicated by the movement of the principal upper surface shock, shown in FIGS. 11 and 12, and variations of pitching moment can conveniently be discussed in terms of movement of this shock. As the shock does not reach positions beyond 50% chord until high Mach numbers are reached (i.e., $M_\infty > 0.725$) $C_M$ varies very little with $C_L$ for Mach numbers below this value. FIG. 13 shows that at constant $C_L$ the pitching moment is almost constant until the shock begins to move rapidly; this sudden rapid movement in shock position, which is shown in FIGS. 15 and 16, causes a rapid increase in nose-down pitching moment. FIG. 14 shows the effect this has on the centre of pressure position; again it is almost fixed until the shock begins to move rapidly, whence the centre of pressure moves rapidly back about 10% of chord.

Typical pressure distribution are shown in FIGS. 17 to 26 for both aerofoils at approximately the same values of lift coefficient.

At Mach numbers greater than 0.7 the aerofoils demonstrate the ability to sustain supersonic flow over a large portion of the upper surface, up to 70% of chord at sonic conditions, the supersonic region being terminated by a weak shock that almost completely disappears at a certain "optimum" combination of Mach numbers and angle of incidence. There are also some very rapid variations in drag just prior to rapid drag rise associated with the shock development.

Figure 17:
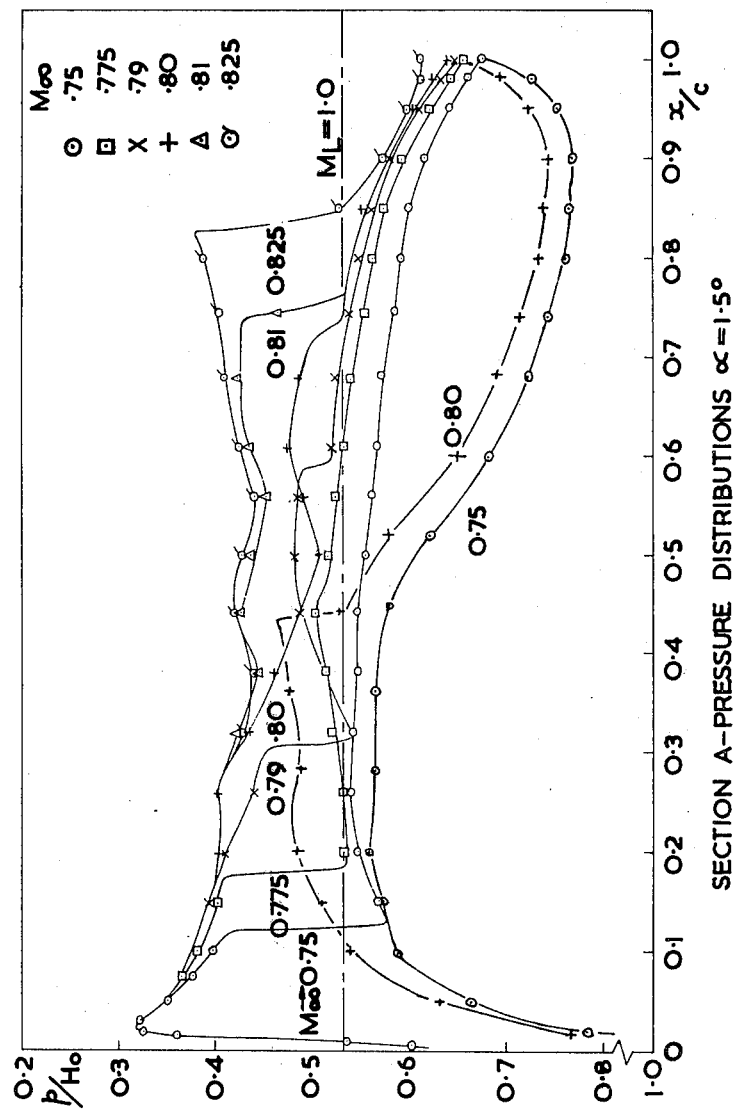
Figure 18:
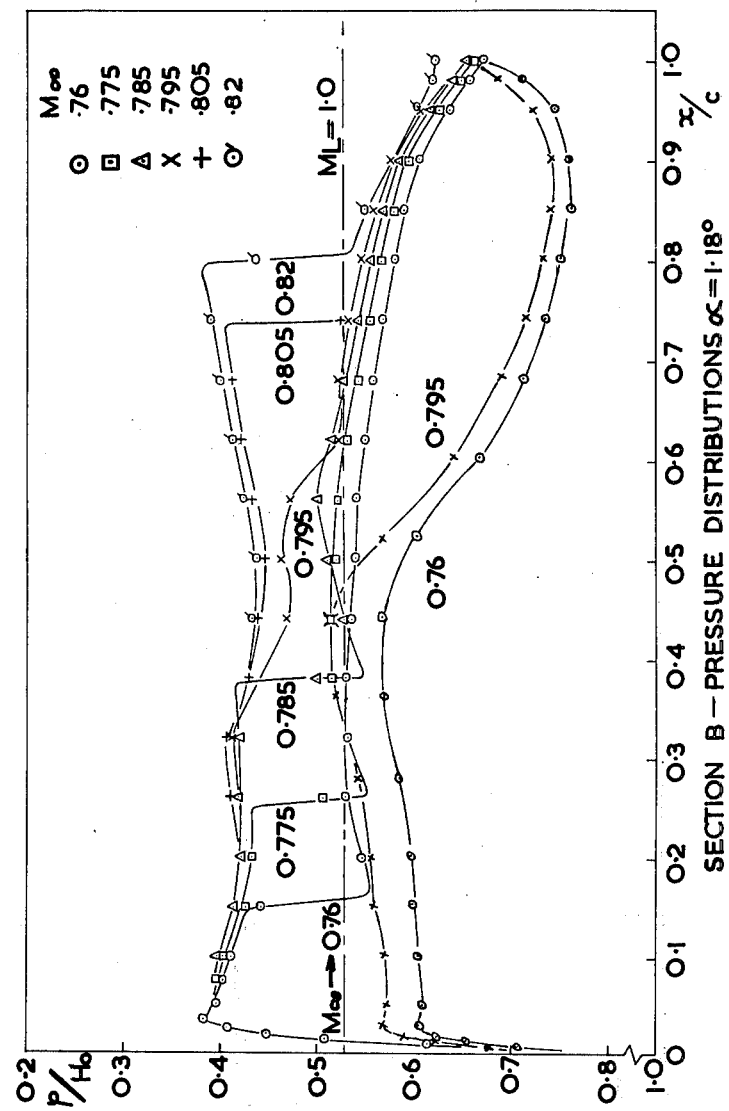

FIGS. 17 and 18 show the development with increasing free stream Mach number of the pressure distribution over the two sections at the optimum angle of incidence (optimum only in the sense that nearly shock free flow is obtained at an appropriate Mach number). Once the critical free stream Mach number is passed, at about $M_\infty = 0.5$, the leading-edge suction peak on the upper surface grows quickly until a free stream Mach number of about 0.65 is reached, when the peak height "freezes" with the local Mach number at about 1.4 in the case of section A and 1.25 for section B. The suction peak is followed by a shock wave which has become quite strong at $M_\infty = 0.75$ (the local Mach number ahead of the shock being 1.2). The upper-surface shock wave moves rapidly rearwards as the free stream Mach number is increased further, allowing progressively more of the recompression to be achieved isentropically following the leading edge peak. At a free stream Mach number of about 0.80 the recompression becomes sufficient for the shock to break up into a series of weak shocks, and at this condition these aerofoils can be claimed to be almost shockless. Following this optimum condition the shock reappears further back along the chord and rapidly increases in strength, giving rise to trailing-edge separation. The lower surface pressure distributions of these Mach numbers show the large amount of lift carried over the rear 50% of the aerofoils because of the high pressures on the lower surface. It can be seen that the effect of increasing free stream Mach number is to increase the local Mach number over the whole lower surface by a similar amount; this gives rise, in the case of section A to the appearance of a shock wave at the lower surface "crest" just prior to the "optimum" free stream Mach number, the strength of which is sufficient to add appreciably to the overall drag. Section B however, does not have a lower surface shock at the corresponding condition because of its modified lead-edge shape, as a result of which the lower-surface flow has only just become critical at the optimum Mach number.

Figure 19:
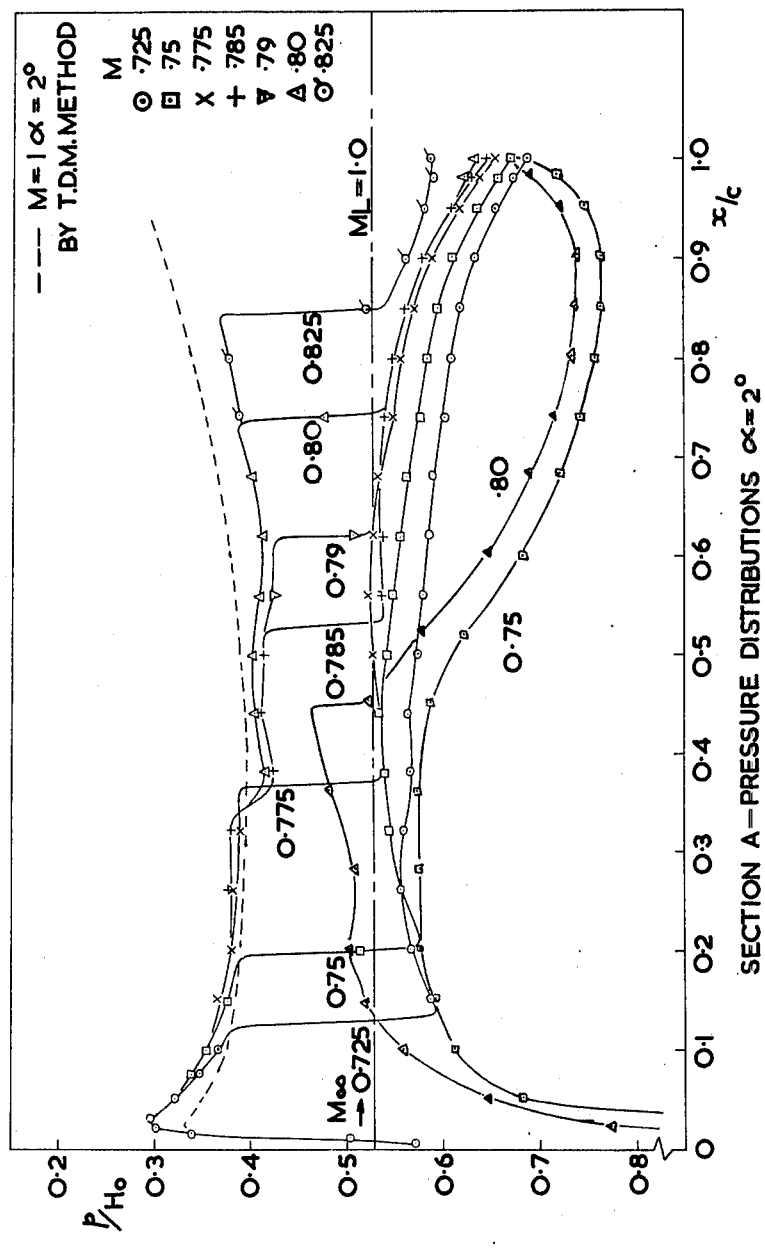
Figure 20:
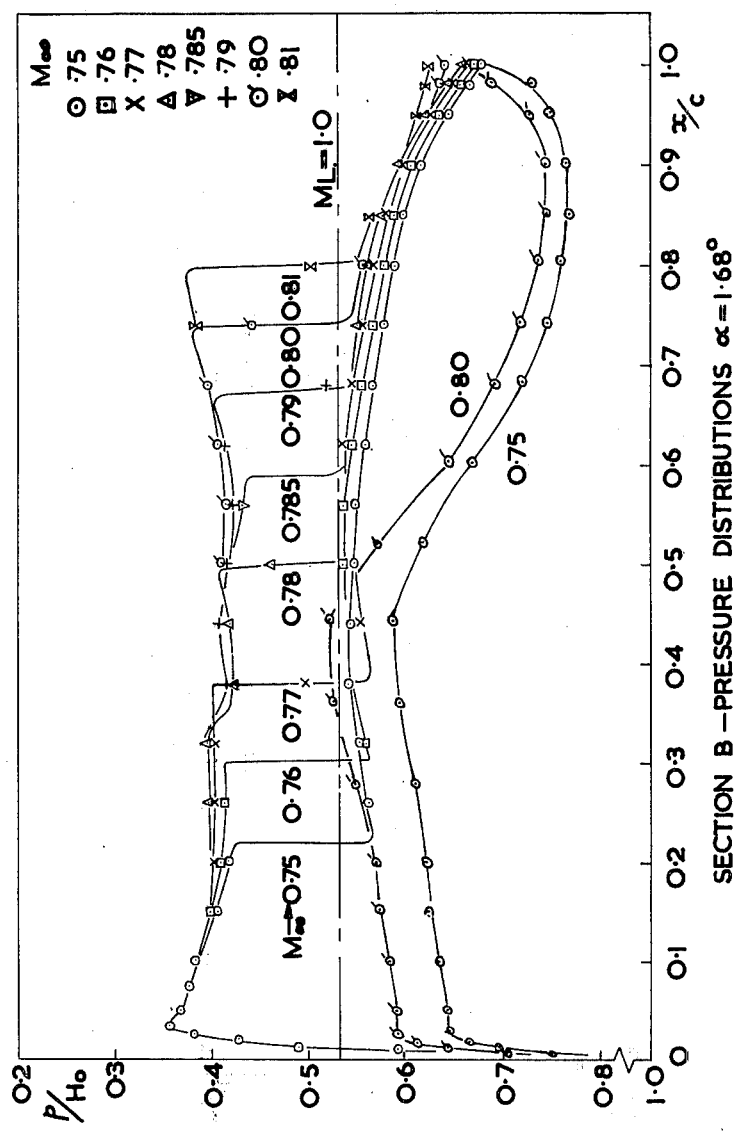
Figure 21:
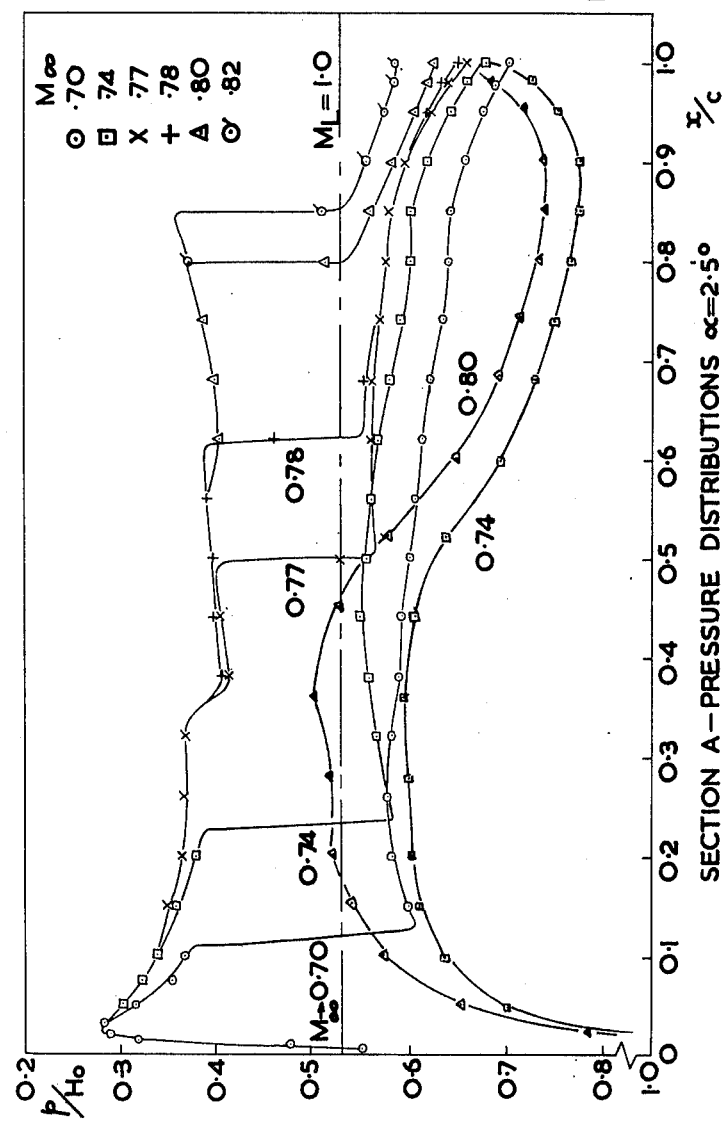
Figure 22:
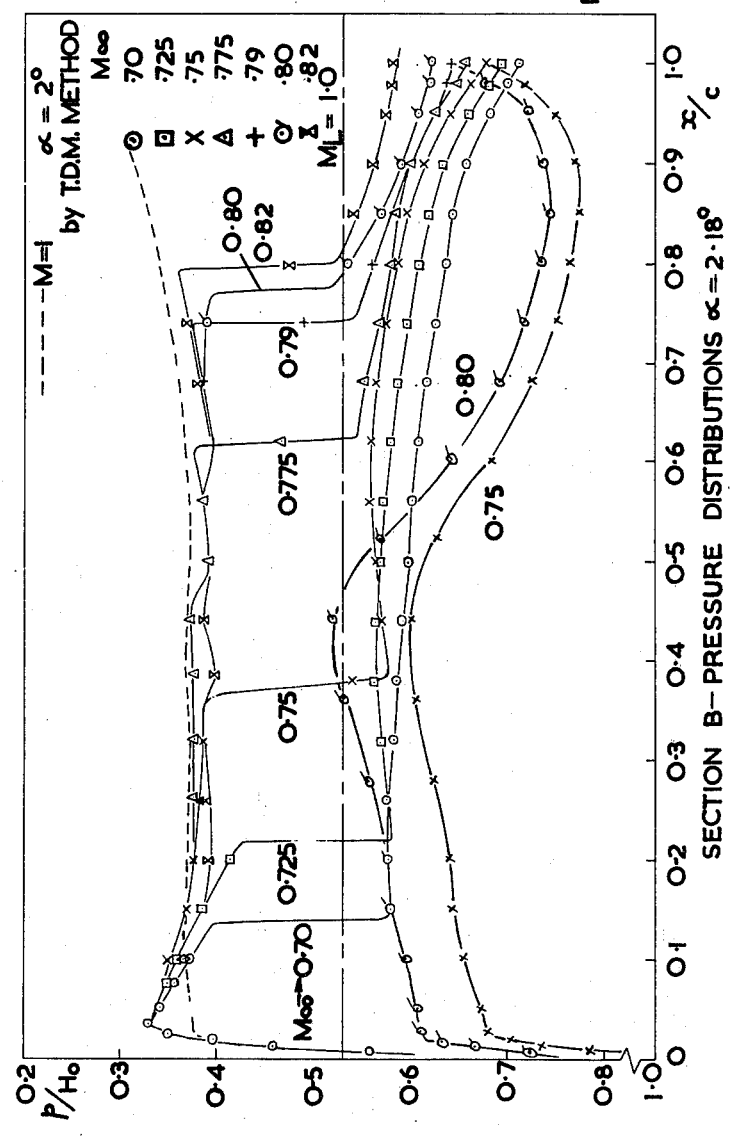
Figure 23:
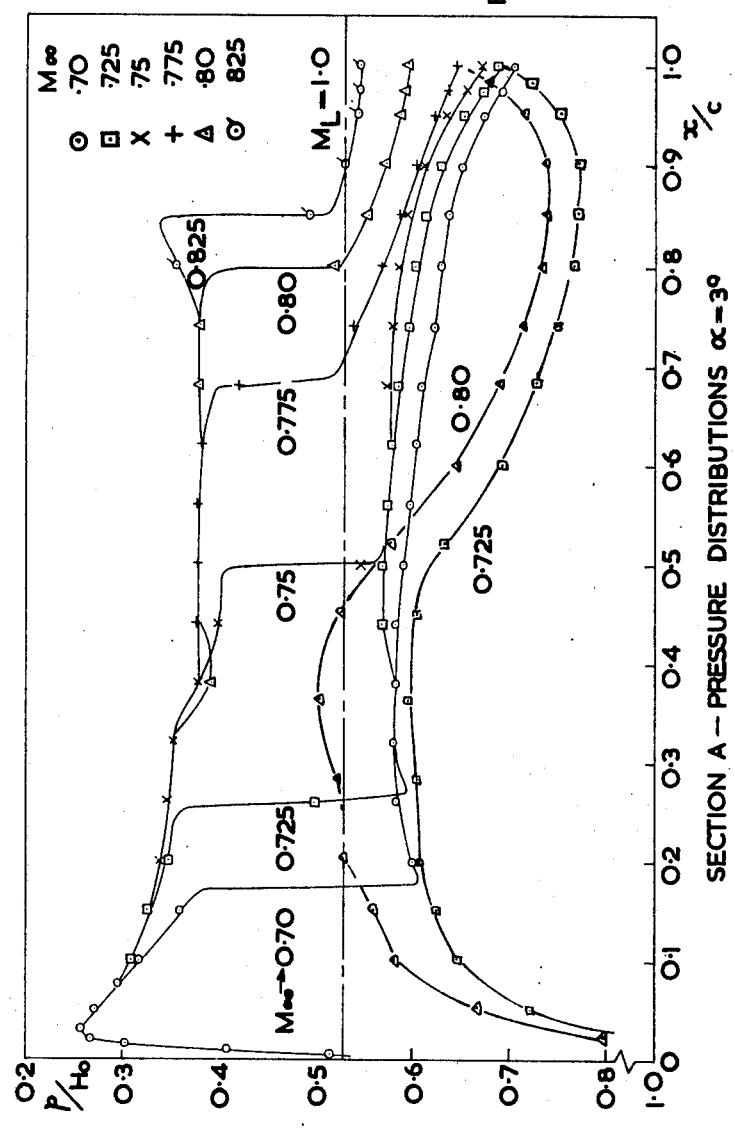
Figure 24:
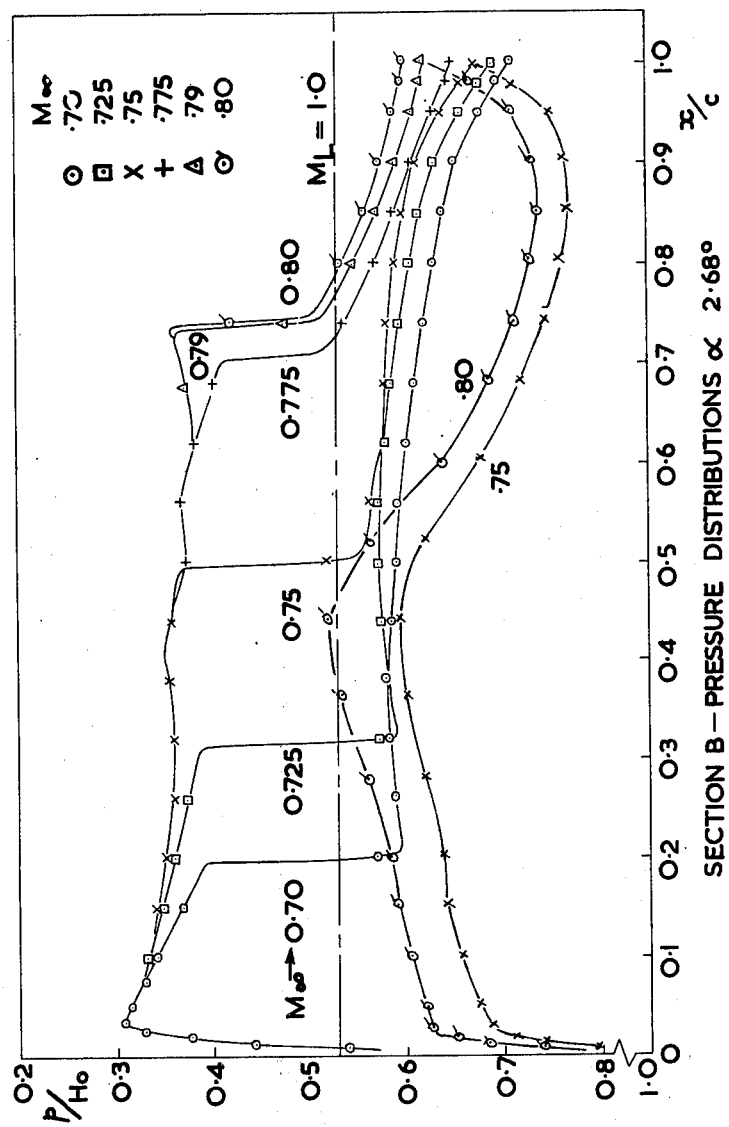

FIGS. 19 to 24 show the pressure distributions over the aerofoils at angles of incidence higher than the optimum. It can be seen that the effect of increasing the angle of incidence is to increase progressively the "peak" height, and thus the aerofoils can no longer recompress the supersonic flow to subsonic flow by an isentropic compression as was possible at the "optimum" angle of incidence. It can be seen in FIGS. 19 to 24 that the supersonic portions of the flow form an envelope. This was found to correspond closely to the "sonic" pressure distribution calculated by the method of RAeS Transonic Data Memo 69013 entitled "A Method for Estimating the Pressure Distribution on the Surface of a Two-dimensional Aerofoil in a Sonic Stream", as can be seen in FIGS. 19 and 22. For all these pressure distributions the upper surface shock wave moves very rapidly with increasing free stream Mach number. In FIG. 7 at a free stream Mach number of 0.79 there is a shock at around 30% chord followed by a re-expansion of the flow, with a tendency for a second weak shock to form at around 60% chord. However, at a free stream Mach number of 0.8, the flow recompresses, following the leading edge "peak", back to around 50% chord, then re-expands slightly and develops a weak shock at about 70% chord. With a further increase in Mach number of about 0.01 to a value of 0.81 the flow recompresses only slightly following the leading edge "peak" and forms a strong shock at 80% chord. The rapid movement of the shock is associated with the very low curvature of the upper surface of these aerofoils. It is interesting to note (FIG. 19) that the pressure rise at the shock reaches a pronounced minimum of about the Mach number (0.79) on section A corresponding to the drag minimum (the so-called drag "bucket"), whereas this effect is less noticeable on section B. It can be seen that for both sections at high angles of incidence (FIGS. 21 to 24) the shock movement becomes restricted by the rear separation spreading forwards. This "sticking" of the shock was also shown in FIGS. 11 and 12. There is no tendency for the shock to move forward as is usually the case at high Mach numbers. It is thought, however, that since the shock is in a position near the trailing edge, and the chordwise extent of the rear separation is so small, the onset of buffeting should be mild. Tentative evidence in support of this has been put forward by Peake and Yoshihara (AGARD-CP-83-81 "The Transonic Performance of Two-dimensional Jet-flapped Aerofoils at High Reynolds Numbers") who found on an aerofoil of similar type that, despite trailing edge pressure divergence, there was no appreciable increase in fluctuation in normal force until $C_{L\ max}$ was approached, and the separated flow over the section became extensive.

Figure 25:
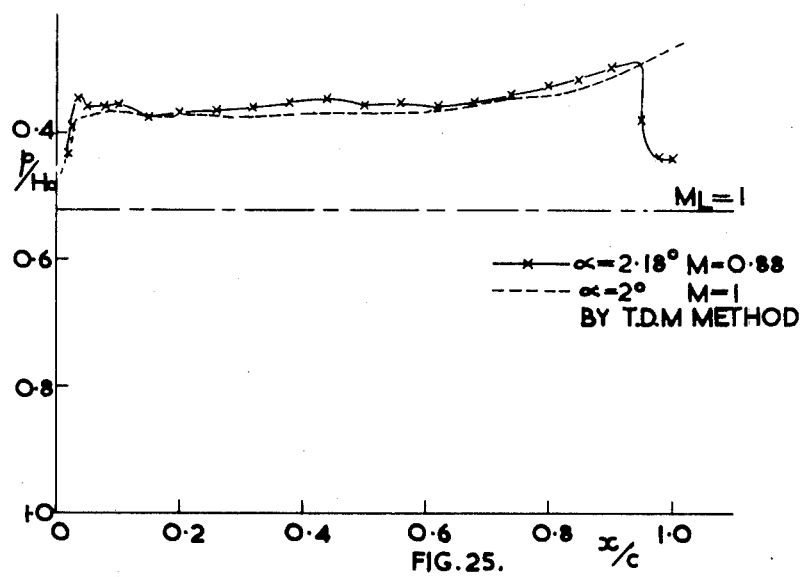

FIGS. 25 and 26 show that the upper surface pressure distributions at the highest Mach number tested conform very closely to the calculated sonic range pressure distribution, mentioned previously, in all but shock position.

FIG. 27 compares the pressure distributions for the two sections at what may be called their "design" condition, that is where the flow on the upper surface recompresses almost isentropically; any shock waves that are present being very weak. It can be seen that the modified nose of section B has reduced the high speed leading edge peak and brought about a somewhat flatter upper surface pressure distribution. Much of the loss of lift from the lower leading edge peak has been recovered by the modified lower surface pressure distribution, where extra load is carried aft of X/C = 0.1 compared with section A. This is a beneficial result of the fairing of the nose modification. Whereas section A has a pressure distribution on the lower surface which is definitely supercritical and is terminated by a weak shock, section B has a flatter distribution which is only just critical.

FIG. 28 compares the pressure distribution on the two sections at an angle of incidence higher by 1⅛°, when both aerofoils are close to the drag rise condition. It can be seen that whilst the lift coefficient is nearly the same on both aerofoils and the upper surface shocks are in identical positions, a shock on section B is marginally the stronger; so that a slight deterioration in high speed performance compared with section A can be expected. This is borne out by the corresponding drag measurement shown in FIGS. 6 and 7 where at $M_\infty = 0.8$ section A is at the bottom of the drag "bucket" at $\alpha = 1.75°$ whereas section B at $\alpha = 1.43°$ is on the rapid drag rise.

Figure 29:
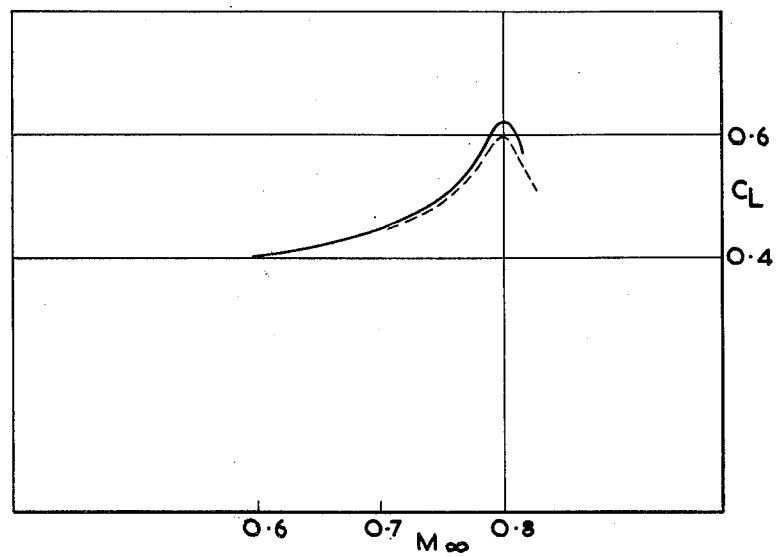

FIGS. 6 and 7 show that the characteristic of a drag "creep" followed by a "bucket" is present on both these sections. There now follows an examination of the conditions which lead to these marked variations in drag just prior to the final drag rise, taking as examples the cases of section A at $\alpha = 2°$ and section B at $\alpha = 1.68°$. As can be seen in FIG. 29 section A shows very large fluctuations in drag in the vicinity of the drag rise condition, as also does section B (though to a somewhat lesser degree) at roughly the same lift coefficient. FIG. 19 shows the development of the upper surface pressure distribution with free stream Mach number; it can be seen that between $M_\infty = 0.725$ and 0.775 the Mach number ahead of the shock remains approximately constant, but between $M_\infty = 0.78$ and 0.79 it reduces appreciably before increasing again for $M_\infty$ greater than 0.80. During this development the shock extends steadily away from the surface. Schlieren photographs for section B at a similar lift coefficient show that it is not possible to deduce directly how the wave drag will vary. Further insight into the process can be gained by looking at the variation of total head in the wake, from which the drag is calculated. FIG. 31 shows some of these wake traverses, while the variation of $C_D$ with $M_\infty$ is shown in FIG. 32 and of local Mach number just ahead of the shock wave ($M_u$) with $M_\infty$ in FIG. 33. Two estimates of the Mach number upstream of the shock are given; (i) Directly from the surface pressure measurements of FIG. 19 and (ii) by using the calculated loss of total head through a normal shock band, assuming that the total head in the wake just outside the viscous core is the same as the total head just downstream of the shock. It can be seen that the Mach numbers predicted by these two methods are in reasonably good agreement and also follow qualitatively the variation of $C_D$. From the wake traverse it is clear that the shock strength at the surface decreases significantly between conditions 1 and 2 and initially dies away rapidly, at condition 2, away from the wake centre line; there is a slight increase in strength, however, further out into the free stream, giving rise to a momentum deficit which must be added into the total drag. At condition 3, although the shock strength at the surface is slightly greater than at condition 2, it also dies away rapidly but in this case does not increase again. As a result the values of drag at conditions 2 and 3 are similar. At condition 4 the shock strength at the surface has built up significantly and takes a greater distance to die away. This condition corresponds to the onset of the final rapid drag rise. Corresponding schlieren photographs have generally confirmed these observations, although at $M_\infty = 0.79$ the shock strength does not appear to decrease so rapidly away from the surface as would have been expected from the wake traverse measurements of FIG. 31. This is perhaps an indication of spanwise variation in shock strength and thus may indicate an uncertainty in the drag deduced from the traverse at one spanwise position only.

Figure 35:
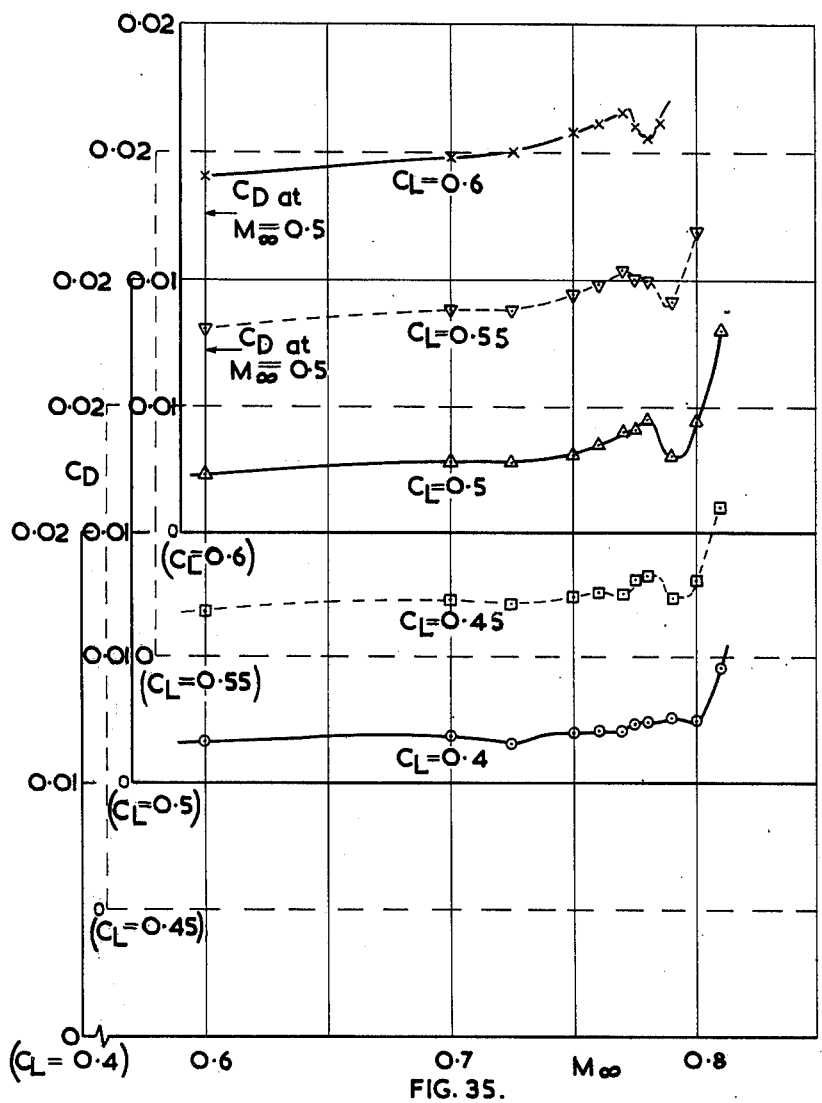

It is convenient to look at the variation of $C_D$ with $M_\infty$ at fixed values of $C_L$ (obtained by interpolation from the values of $C_D$ measured at constant angle of incidence) between 0.4 and 0.46. These are shown in FIGS. 34 and 35. Presented in this way, the "hump" in the drag curves appears to be lower and less steep than when the curves are plotted at constant angle of incidence (compare the drag curves in FIG. 29 with the curves for $C_L = 0.5$ in FIGS. 3 and 35; however, the reduction in drag to a minimum, between $M_\infty = 0.785$ and 0.795, appears accentuated, particularly at lift coefficients above 0.5.

Figure 36:
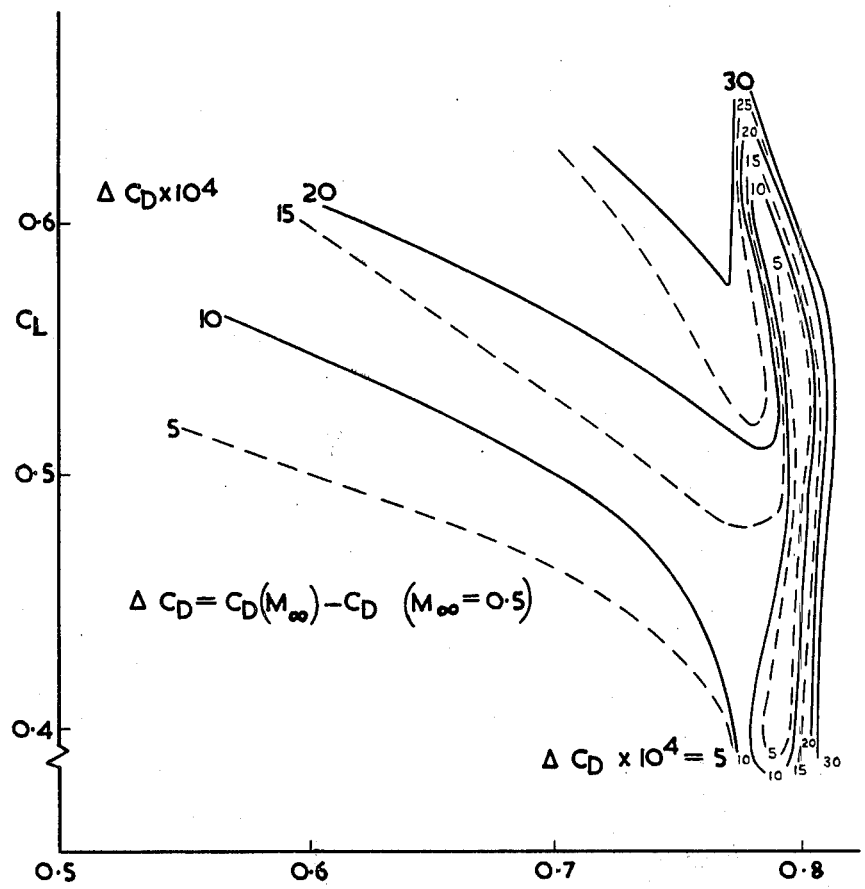
Figure 37:
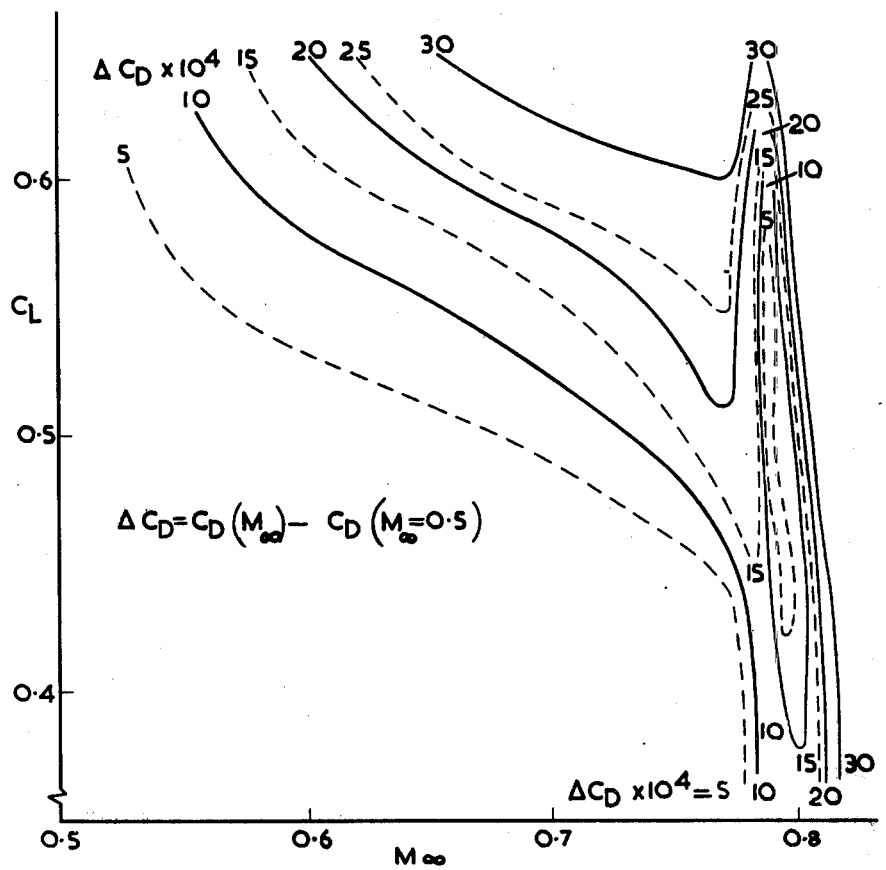

To obtain a quantitative picture of the wave drag, ie the drag increment due to the presence of shock waves, FIGS. 36 and 37 have been plotted. They show contours in the $C_L$, $M_\infty$ plane of $\Delta C_D$, the increase in $C_D$ above its values at $M_\infty = 0.5$ at the same value of $C_L$. (Since the flow at $M_\infty = 0.5$ will be largely subcritical for $C_L < 0.6$, and, in the absence of shock waves, profile drag will vary very little with M at constant $C_L$, these contours should represent closely the values of wave drag.). The most interesting feature of FIGS. 36 and 37 is the trough in wave drag near M = 0.79 which extends from $C_L = 0.4$ to 0.6, and covers a band in Mach number about 0.01 wide, for which the wave drag coefficient ($\delta C_D$) is less than 0.001. This trough, approached in the direction of increasing Mach number, is preceded by a ridge, (a drag creep already mentioned) of increasing height and steepness as $C_L$ is increased. However the height of this ridge does not exceed $\Delta C_D = 0.002$ (a criterion commonly used for identifying the "drag rise" condition) for lift coefficients below about 0.55, which is probably the maximum useful operating lift coefficient of these aerofoils at high Mach number for other reasons (the buffet boundary shown in FIG. 8). Thus, although the premature drap creep is undesirable, and should be eliminated if possible, it may not be too serious in a practical application.

Near $M_\infty = 0.70$ a remarkably high lift coefficient, at least 1.2 is obtained before appreciable separation occurs; in contrast if the Mach number is reduced slightly the high lift performance deteriorates rapidly, giving a useable $C_L$ of only 0.9 between $M_\infty = 0.5$ and 0.6. The reasons for this behaviour are now analysed.

Figure 38:
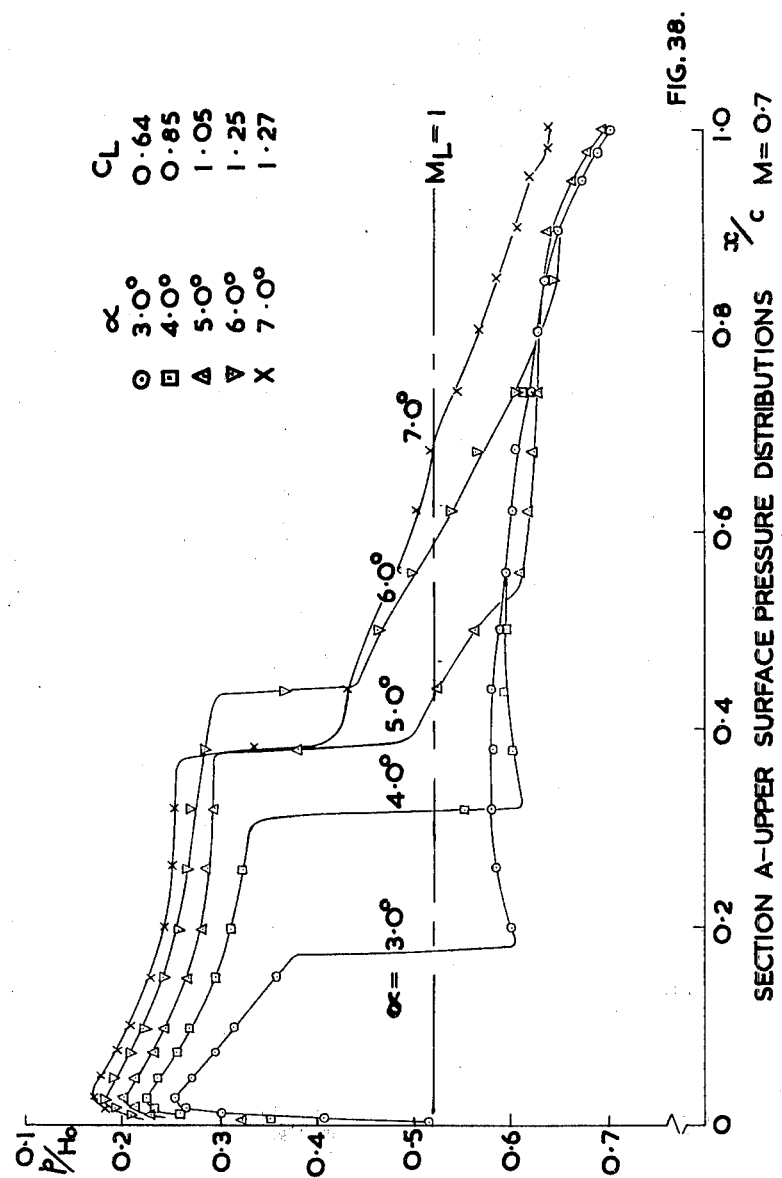
Figure 39:

FIGS. 38 and 39 show the upper surface pressure distributions for the two aerofoils as a free stream Mach number 0.7, at angles of incidence between 3 and 7°. A large chordwise extent of supersonic flow is present at the higher angles of incidence, determinated by a shock wave which first produces a small separation bubble at its foot at α = 5° and 4.18°, the flow re-attaching before it reaches the trailing edge. (The blunt base is helpful in mitigating trailing edge separation by increasing the trailing edge velocity, to the extent that the pressure there is below free stream static.). As the angle of incidence is increased, the local Mach number of the forward part of both aerofoils increases steadily and uniformly (almost independently of X/C), and the shock wave, terminating the supersonic region, moves rearwards and increases in strength until eventually a stage is reached when the strength of the shock is sufficient to create a separation spreading from the foot of the shock to the trailing edge. When this occurs, at about α = 7°, the supersonic region has a maximum local Mach number of 1.65, decelerating to 1.5 just ahead of the shock at X/C = 0.45; and it is this feature which leads to the high lift coefficient, the supersonic region alone contributing more than 0.5 to $C_L$. At this stage which would be expected to correspond to the onset of the appreciable buffeting, the lift coefficient has reached the high value of 1.2 for both aerofoils. Local oscillations in pressure may however be expected under the separation bubble caused by the shock, before the separation has spread into the trailing edge.

Figure 40:
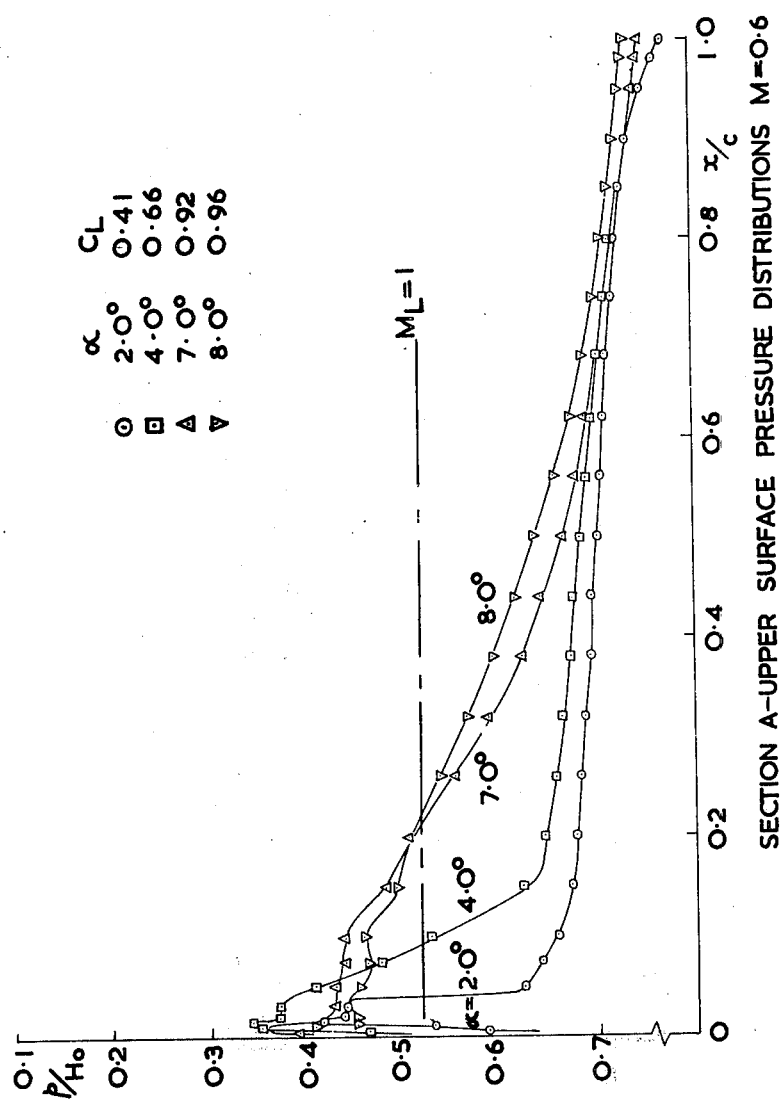
Figure 41:
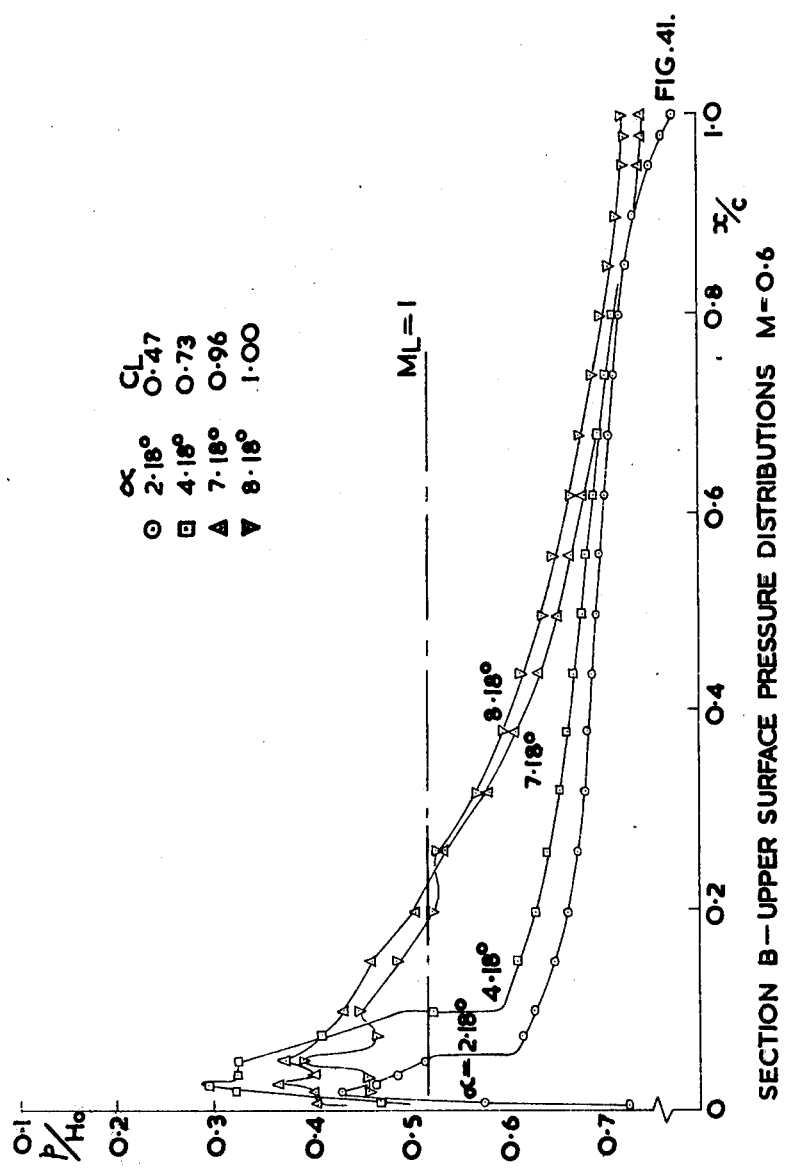

FIGS. 40 and 41 show the upper surface pressure distributions for a free stream Mach number of 0.6 under varying angles of incidence. The flows are entirely different in character from those at $M_\infty$ = 0.7 (FIGS. 38 and 39) being dominated by leading edge separation bubbles leading to the collapse of the leading edge peak. The separation leading to the bubbles is probably laminar, since it is unlikely that transition will have occurred by the beginning of the bubble. At these angles of incidence and Mach number both sections behave in a similar manner, although section B achieves a higher suction before the flow breaks down.

There is a change in character if the flow between $M_\infty$ = 0.7. As the Mach number increases beyond 0.65 the supersonic flow region expands and develops a favourable influence on lift because of the high suctions in the supercritical region, whereas for M < 0.65 the supersonic region is of limited chordwise extent, and the separation of the laminar boundary layer near the nose by the terminating shock wave results in adverse effects on lift. It is at low speeds that section B shows its ability to achieve a higher value of lift coefficient, before the upper surface flow breaks down, compared with section A; this in entirely due to the modified nose shape.

Figure 42:
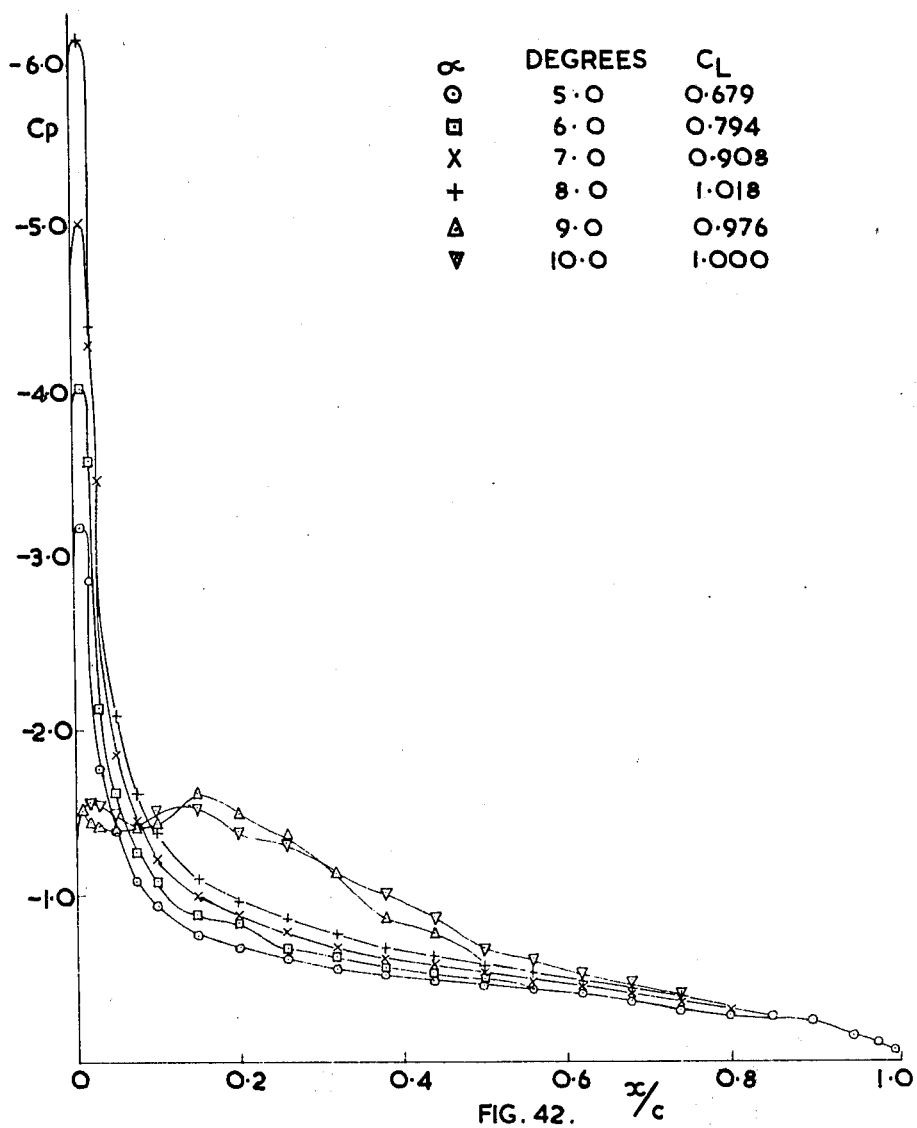
Figure 43:
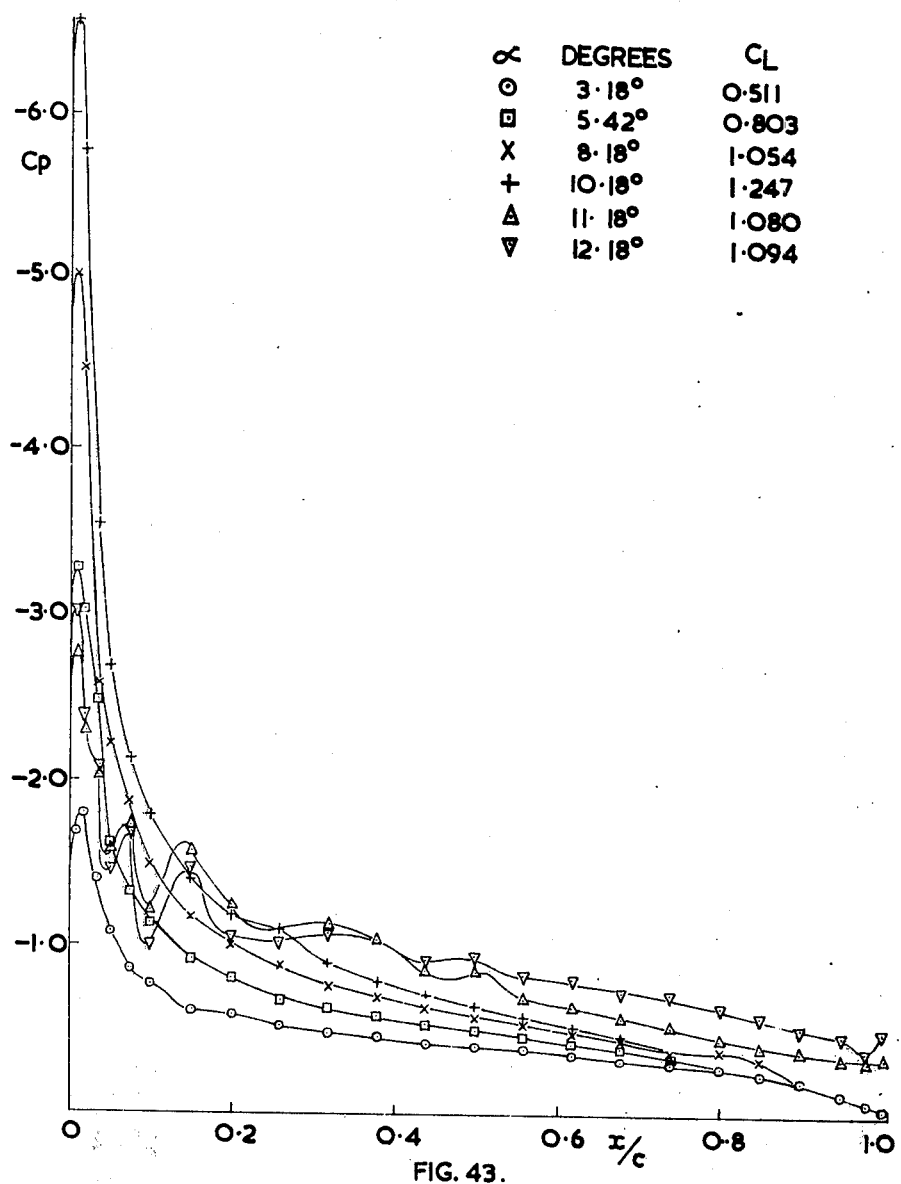
Figure 44:
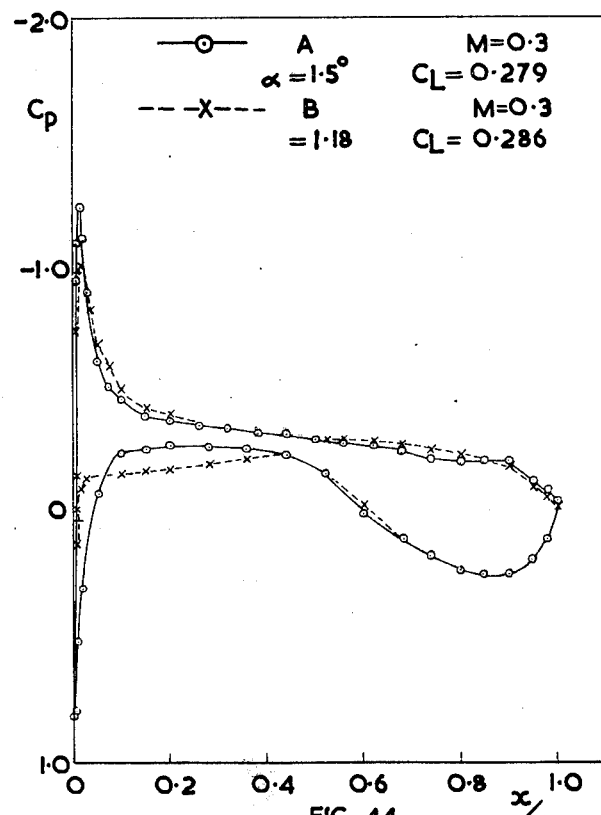
Figure 45:
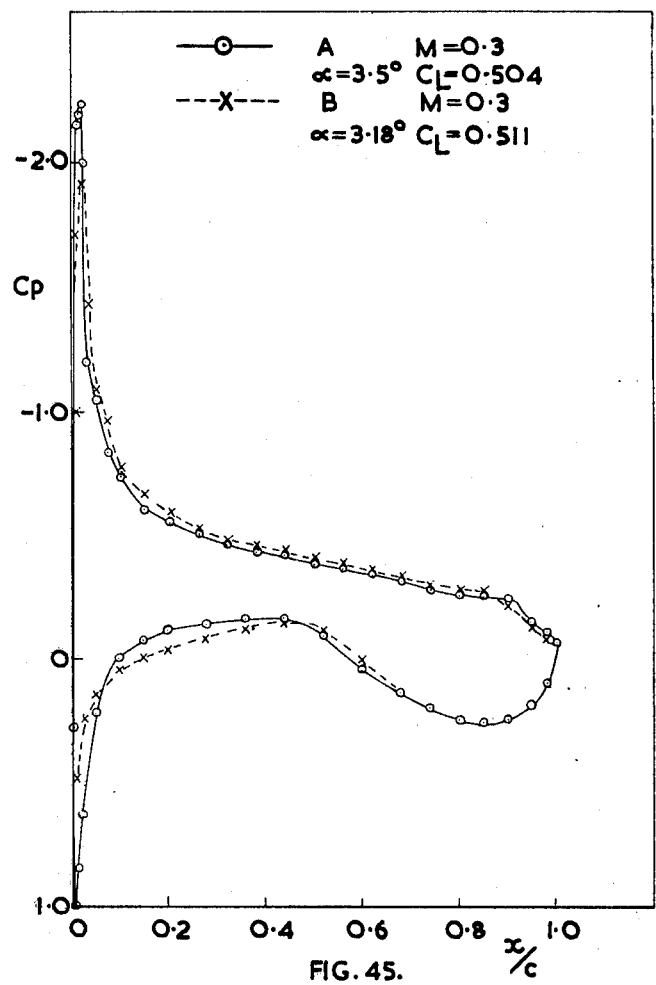
Figure 47:
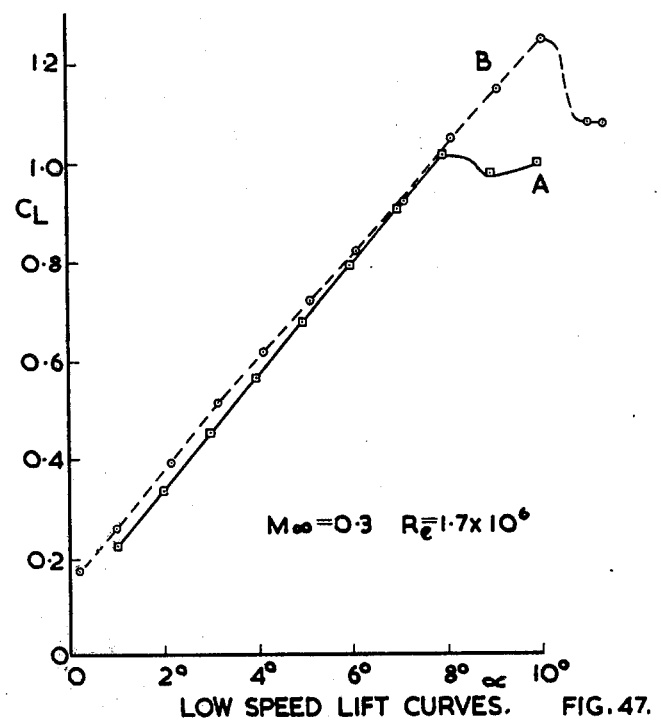

FIGS. 42 and 43 compare the upper surface pressure distributions on the two sections at a free stream Mach number of 0.3. They show that, although both sections have a similar limiting value of peak $C_P$ just prior to separation, the occurrence of the peak is delayed to a higher angle of incidence on section B and thus a higher $C_{L max}$ is achieved (1.2 compared with 1.0 for section A). From FIG. 40 it can be seen that on section A, once the leading edge peak has collapsed, an extensive separation bubble forms, which appears to increase the suction on the upper surface between say 15% and 50% chord, so that the aerofoil continues to generate a substantial lift coefficient. However this lift may be of little use in practice since there will be considerable buffeting associated with the bubble. FIG. 43 shows that on section B a separation bubble forms and almost immediately spreads to the trailing edge (there is some evidence of a bubble forming at α = 10.18° around X/C = 0.25) and thus there is a rapid loss of lift following $C_{L max}$ as shown in FIG. 47. FIGS. 44 and 45 show that the values of $C_L$ for which the flow is fully attached the only differences between the pressure distributions are the lower peak height on section B and the modified lower surface pressure distribution.

Figure 46:
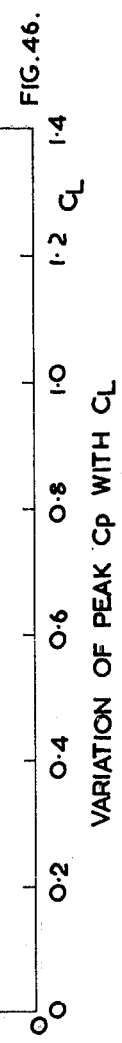

FIG. 46 shows the variation in peak $C_P$ with $C_L$; this figure confirms that for a fixed $C_L$ section A generates a higher leading edge peak; or conversely for a fixed $C_P$ section B gives a useful increase in $C_L$ over section A. The increase is not quite as much as is indicated by the method of Hess and Smith in "Calculation of Potential Flow about Arbitrary Bodies" in "Progress in Aeronautical Sciences" Volume 8 Pergamon Press, London (1966). This is partly because of viscous effects and partly because the experimental results at a free stream Mach number of 0.3 show some effects of compressibility.

The results described indicate that these aerofoil sections show a considerable improvement in drag rise Mach number over conventional types and at a low drag level. Both sections exhibit rapid variations in drag just prior to the final drag rise, which can be ascribed to corresponding variations in wave drag, due to changes in the strength and lateral extent of the shock wave that terminates the supersonic flow on the upper surface. Section A has slightly better separation margins at high Mach numbers and moderate lift coefficients, whereas at Mach numbers between 0.3 and 0.6 section B has better high lift characteristics.

At Mach numbers near 0.7 a very high lift coefficient is obtained, over 1.2, before serious effects of boundary layer separation are observed. At the optimum conditions ($M_\infty$ = 0.8, $C_L$ nearly = 0.5) both sections exhibit very nearly shock free recompression, of which that on section B appears to be nearly isentropic.

As an alternative to the fixed droop of section B, sections in accordance with the invention may have flexible leading edges. Of those described in U.S. Pat. No. 3,716,209, two are particularly suitable.

One is shown in FIG. 50, and as shown therein an aircraft main wing 44 has a main spar 45 and a flexible leading edge portion 46. A frame 47 extending forwards from the main spar provides pivotal support at 48 for a swinging frame 49 which supports the flexible portion 46 at its foremost region. The frame 47 also provides pivotal support at 50 . . . 50 for the inner ends of a set of swinging support arms 51 . . . 51. Each arm 51 is pivotally supported at 52 at its outer end to brackets 53 secured to the flexible portion 46. The swinging frame 49 has a crank arm 54 pivotally secured at 55 to the piston arm 56 of a power jack 57. The jack 57 is pivotally mounted at 58 to the frame 47 and has a connection 59 to a power source. The flexible portion 46 has brackets 60 . . . 60 holding retaining pins or rollers 61 . . . 61 which latter engage flanged members 62 secured to the upper and lower surface regions of the main wing 44. By this arrangement the rearmost regions of the flexible portion 46 can slide with respect to the main wing but is retained in close contact with it. The location of the fixed pivot points 50 . . . 50 and hence the length of the respective arms 51 is determined by the profile changes which are required. Thus in this case for aerodynamic considerations, the profile of the flexible leading edge portion 46 is required to be varied from an upper condition D through an intermediate condition E to a lower condition F. The determination of the position of the fixed pivot point for the lower forward arm 51 is shown by way of example where its outer pivot 52 is shown at 52D, 52E and 52F, respectively. The point where the two bisectors of 52D-52E and 52E-52F meet is the position for the fixed pivot 50 for this particular arm 51. The position of the respective fixed pivots for the other arms 51 is determined in a like manner.

In operation the jack 57 is operative to hold the swinging frame 49 in condition D at cruise conditions. For lower flight speeds the jack is operative to move the swinging frame 49 through condition E until at landing or take off speed it is in condition F. It will be seen that as the swinging frame 49 moves the arms 51 will swing about their fixed pivots 50 and the position of their outer ends will determine the profile of the flexible leading edge portion 46 which they support. At the same time the rearmost regions of the flexible portion 46 will slide with respect to the main wing.

With this arrangement the degree of profile variation of the leading edge which is possible enables the aerodynamic efficiency of the main wing leading edge portion combination over an aircraft's speed range to be higher than in the case of a fixed profile arrangement.

Referring now to FIG. 51, this arrangement is basically similar to that described above with reference to FIG. 50 with the exception that the swinging arms 71 and the swinging frame 72 are pivotally supported at 73 . . . 73 and 74, respectively on a carrier 75 which is movable with respect to the main spar 76. The carrier is supported by the piston rod 77 of a control jack 78 pivotally supported on the main spar 76 and 79. The carrier 75 has trunnions 80 which engage guide slots as at 81 in side plates (not shown) carried by the main spar 76. The carrier 75 also supports a secondary control jack 82 having a piston arm 83 pivotally secured at 84 to a crank 85 extending from the swinging frame 72.

In operation actuation of the control jack 78 causes motion of the carrier 75, the trunnions 80 running along the guide tracks 81. Extension or retraction of the whole leading edge section within the limits of the guide tracks 81 is thus possible. Also, actuation of the secondary control jack 82 causes angular movement of the swinging frame 72 about the pivot point 74 and corresponding swinging motion of the arms 71 whereby the profile of the leading edge can be changed to take up positions as shown in chain dotted lines. The jacks 78 and 82 may be operated simultaneously.

Thus one can take a section such as B, which has, by virtue of its leading edge droop, good low speed properties, and by merely flexing the leading edge by means such as those described above, arrive at a section such as A which has improved performance at the design cruising speed.

So the results indicate that supercritical wings can be constructed having the sections in accordance with the invention to have adequate lift and low drag at design cruising speeds in the region of $M_\infty = 0.7$ to $0.8$ and yet produce adequate lift for take off of large transport aircraft (seats 200 to 300) on runways currently in use. The sections can in principle be used in military aircraft as well, although the high sweep of the wings of these type may necessitate some adaptation of the sections.

We claim:

1. A supercritical aerofoil having a leading edge, an upper and a lower surface and a trailing edge and wherein the leading edge is circular with a radius of 2% to 4% chord, the upper surface has a forward transition zone extending from said leading edge to about 20% of the distance along the chord and wherein the upper surface curvature radius increases rapidly from said leading edge radius to one from about 3 to about 5 times the chord, a constant radius zone extending from said forward transition zone for about 0.5 to 0.8 of the chord length and wherein the radius is substantially constant at 3 to 5 times the chord, and a rear zone extending to the trailing edge and wherein the curvature decreases rearwardly; the lower surface has a forward zone extending from the leading edge to a point not less than about 40% and not more than about 55% of the chord the radius of curvature whereof is at least equal to the chord but smaller than said upper surface constant radius zone radius, a curvature transition zone extending from said forward zone to between 55% and 70% of the chord, and a rearward zone extending from the transition zone to about the trailing edge and which is concave and has a mean radius of about equal to the chord, whereby a rear part of the aerofoil is effectively cambered; and said leading edge being a drooped leading edge, and the aerofoil having a thickness/chord ratio of 10% to 14%; whereby in use at supercritical speeds air passing over the upper surface is rapidly accelerated over the leading edge and forward zone to a supersonic speed and decelerated sufficiently before the trailing edge to permit the effective camber of the rear part of the aerofoil to augment the lift and without generating a shock wave sufficiently strong to cause a significant increase in drag, and in use at low speeds sufficient lift is generated for take off and landing on normal length runways.

2. An aerofoil as claimed in claim 1 wherein said leading edge is a flexible leading edge.

3. An aerofoil as claimed in claim 1 and having a base thickness of up to 2% chord.

* * * * *